US012138225B2

(12) United States Patent
Mayne et al.

(10) Patent No.: US 12,138,225 B2
(45) Date of Patent: Nov. 12, 2024

(54) ENTERAL FEEDING DEVICE

(71) Applicant: ROCKFIELD MEDICAL DEVICES LIMITED, Galway (IE)

(72) Inventors: Donal Mayne, Celbridge (IE); Tomas Martin Thompson, Athenry (IE); Damian Kelly, Galway (IE)

(73) Assignee: Rockfield Medical Devices Limited, Galway (IE)

( * ) Notice: Subject to any disclaimer, the term of this patent is extended or adjusted under 35 U.S.C. 154(b) by 899 days.

(21) Appl. No.: 15/734,773

(22) PCT Filed: Jun. 12, 2019

(86) PCT No.: PCT/EP2019/065383

§ 371 (c)(1),
(2) Date: Dec. 3, 2020

(87) PCT Pub. No.: WO2019/238773

PCT Pub. Date: Dec. 19, 2019

(65) Prior Publication Data

US 2021/0228451 A1 Jul. 29, 2021

(30) Foreign Application Priority Data

Jun. 14, 2018 (EP) .................................... 18177719

(51) Int. Cl.
*A61J 15/00* (2006.01)
*A61J 1/10* (2006.01)

(52) U.S. Cl.
CPC ............. *A61J 15/0026* (2013.01); *A61J 1/10* (2013.01)

(58) Field of Classification Search
CPC .... A61J 15/0026; A61J 1/1475; A61J 1/1481; A61J 1/1487; A61J 1/10; A61J 1/1406;
(Continued)

(56) References Cited

U.S. PATENT DOCUMENTS 4,195,632 A * 4/1980 Parker ................. A61M 39/221
604/905
4,983,431 A * 1/1991 Gibbons ................... B32B 1/02
428/512

(Continued)

FOREIGN PATENT DOCUMENTS

DE 102004033205 A1 * 2/2006 ................ A61J 1/05
DE 10 2012 212776 A1 1/2014
EP 2 140 907 A1 1/2010

OTHER PUBLICATIONS

International Search Report issued in PCT/EP2019/065383; mailed Sep. 11, 2019.

(Continued)

*Primary Examiner* — Robert J Utama
*Assistant Examiner* — Leah J Swanson
(74) *Attorney, Agent, or Firm* — Studebaker & Brackett PC

(57) ABSTRACT

A portable enteral feeding apparatus includes a pouch which defines a reservoir for enteral fluid and having an outlet for delivery of enteral fluid from the pouch. An outlet spout has a pouch spigot connected to the pouch outlet and a connector spigot which is adapted for mounting of a connector shaft, in one case a cross fit shaft of an ENFit connector. A valve is mounted to the spout. The connector spigot has a mounting structure for mounting a connector shaft of a PEG feeding system to the connector spigot only when the connector shaft is extended through the valve. An interlock prevents fixing of a connector shaft to the connector spigot if the connector shaft is not extended through the valve.

15 Claims, 35 Drawing Sheets

(58) Field of Classification Search
CPC .......... A61J 1/1418; A61J 1/1468; A61J 1/14; A61J 1/1412; A61J 1/1425; A61J 1/1437; A61J 1/1443; A61J 1/145; A61J 1/1456; A61M 2039/085; A61M 2039/1094; A61M 2039/1072; A61M 39/10; A61M 39/1011; A61M 39/1055; A61M 39/24; A61M 39/26; A61M 39/06; A61M 39/0606; A61M 39/0613; A61M 39/062; A61M 39/0626; A61M 39/0633; A61M 39/064; A61M 39/0646; A61M 39/0653; A61M 39/066; A61M 39/0666; A61M 39/0673; A61M 39/068; A61M 39/0686; A61M 39/0693; A61M 39/105; A61M 39/12; A61M 39/16; A61M 39/162; A61M 39/165; A61M 2039/0294; A61M 2039/1027; A61M 2039/1033; A61M 2039/1038; A61M 2039/1044; A61M 2039/2426; A61M 2039/261–268; A61M 2039/0009; A61M 2039/009; A61M 2039/1011; A61M 2039/1016; A61M 2039/1022; A61M 2039/1061; A61M 2039/1066; A61M 2039/1077; A61M 2039/1083; A61M 2039/1088; A61M 2039/2406; A61M 2039/2413; A61M 2039/242; A61M 2039/2433; A61M 2039/244; A61M 2039/2446; A61M 2039/2453; A61M 2039/246; A61M 2039/2466; A61M 2039/2473; A61M 2039/248; A61M 2039/2486; A61M 2039/2493
See application file for complete search history.

(56) References Cited

U.S. PATENT DOCUMENTS

| | | | | | |
|---|---|---|---|---|---|
| 5,372,578 | A * | 12/1994 | Kriesel | A61M 5/152 604/9 |
| 2008/0310768 | A1 * | 12/2008 | Hobson | B65D 88/20 383/33 |
| 2011/0118676 | A1 * | 5/2011 | Kropczynski, Jr. | A61M 5/162 604/257 |
| 2012/0310177 | A1 | 12/2012 | Becker et al. | |
| 2016/0199258 | A1 | 7/2016 | Py | |
| 2018/0303720 | A1 * | 10/2018 | Kennard | A61J 15/0011 |

OTHER PUBLICATIONS

The Extended European Search Report issued by the European Patent Office on Oct. 12, 2022, which corresponds to EP 22185665.1-1113 and is related to U.S. Appl. No. 15/734,773.

An Office Action issued by Intellectual Property India on Jun. 9, 2022, which corresponds to Indian Application No. 202037053031 and is related to U.S. Appl. No. 15/734,773.

* cited by examiner

ENTERAL FEEDING DEVICE

INTRODUCTION

Enteral feeding or tube feeding is used worldwide by people who are unable to voluntarily eat or swallow food. Enteral feeding delivers the required nutrition to these people using a pump driven electrically from a mains supply or a battery. The pump administers a prescription formula directly into the stomach or nasal system, through a tube which is surgically inserted.

A PEG (Percutaneous Endoscopic Gastronomy) is a fixture which is inserted into a patients stomach which allows a feeding tube coming from a pump to be attached for feeding to commence. Some of the reasons why patients require a PEG are head trauma, stroke, collagen vascular disorder and cancers such as head, throat or oesophageal. Other reasons behind requiring enteral feeding can occur from needing to gain weight via a pre port option, which is used by people who can't get the required calories from their normal diet; neurological conditions such as motor neuron disease, brain tumour, Parkinson's disease or as a result of a brain injury. Surgical conditions such as preoperative or postoperative surgery, burns, or pancreatitis; a psychiatric issue like anorexia nervosa; or disorder such as cystic fibrosis may also require enteral feeding.

Some of the problems with current technology used in enteral feeding include the noise and vibrations of the pump used to deliver the liquid formula, the difficulty that users can experience when setting up the pump and, most importantly, the restriction to the persons mobility. Conventional feeding systems involve pumps which are battery or electronically powered. Noise and vibrations are produced which can be very disturbing, especially when trying to sleep at night. When feeding at home, patients are required to be lying down or seated, then the pump is placed on an IV type stand with the bag held higher over the pump. A single serving of approximately 500 ml to 1000 ml can take from 4 to 24 hours to be administrated, but this is entirely dependent of the patient, as serving a feeding too fast can lead to stomach pains or vomiting, and releasing the formula too slow will have less effect and leave the patient tired and lacking in energy.

It is also necessary to have this setup beside their bed for night feeding. Slower feed rates are generally used at night for a longer release of food for the patient. Patients often find it difficult and irritating, when trying to sleep with the constant noise, vibration and also visual impact (lighting) of the pump.

When a patient is not at home they are required to use a special carry bag for the pump, formula, tubing and all other equipment needed. The conventional carry bag is approximately the same size of an average back pack. It allows the user to feed, while preforming some tasks but it is restrictive. Gravity is required to allow flow from a container for enteral fluid to a pump. The pump also requires an electricity supply and/or a battery pack. The units must also be programmed using a complex interface. The current portable systems are heavy and bulky which means that they are not very mobile and are not discrete.

STATEMENTS OF INVENTION

The invention provides a portable enteral feeding apparatus for PEG feeding. The apparatus comprises a pouch which defines a reservoir for enteral fluid and having an outlet for delivery of enteral fluid from the pouch. An outlet spout has a pouch spigot connected to the pouch outlet and a connector spigot which is adapted for mounting of a connector shaft, in one case a cross fit shaft of an ENFit connector. A valve is mounted to the spout. The connector spigot has mounting means for mounting a connector shaft of a PEG feeding system to the connector spigot only when a connector shaft is extended through the valve. An interlock is provided to prevent fixing of a connector shaft to the connector spigot if the connector shaft is not extended through the valve.

The invention provides a portable enteral feeding apparatus comprising:—

- a pouch which defines a reservoir for enteral fluid and having an outlet for delivery of enteral fluid from the pouch;
- an outlet spout having a pouch spigot connected to the pouch outlet and a connector spigot which is adapted for mounting of a connector shaft;
- a valve mounted to the spout;
- the connector spigot having mounting means for mounting a connector shaft of a PEG feeding system to the connector spigot when a connector shaft is extended through the valve; and
- an interlock to prevent fixing of a connector shaft to the connector spigot if a connector shaft is not extended through the valve.

In one case the connector spigot comprises a plurality of grooves and the interlock comprises an end stop in at least one of the grooves to prevent passage of a connector shaft formation. The connector spigot may comprise four grooves. Each groove may be 90° circumferentially spaced-apart from an adjacent groove. Two of the grooves which are spaced-apart by 180° may have end stops.

In one case the connector spigot comprises a screw thread which is adapted for engagement with a connector cap. The screw thread may be adapted to engage with a connector cap only when a connector shaft extends through the valve.

In one case the spout comprises a receiver for the valve. The valve receiver may comprise a ledge for engagement with the valve. There may be a retainer element for retaining the valve in position in the spout.

In one case the valve is a zero seal valve such as a slit valve. The valve may comprise an elastomeric material such as silicone.

In one case the first spigot comprises side wings for mounting the pouch to the first spigot. At least one of the wings may comprise an air vent for venting of air during filling of the pouch.

In one case the first spigot is adapted for mounting the outlet of the expansile element to the first spigot. The first spigot may comprise a mounting feature such as a groove to which the expansile element is mounted. In one case there is a locking element for mounting the expansile element to the mounting feature of the housing.

In one case the apparatus further comprises a connector having a distal shaft and proximal mounting features for connection to a feeding tube, the distal shaft having connector formations which are adapted to engage with the connector spigot. The distal shaft may be a cross connector shaft.

In one case the pouch outlet also provides an inlet for filling the enteral fluid into the pouch.

The pouch may be formed from an expansile element having an expanded filled configuration and a collapsed configuration. Expansion of the expansile element may provide the sole force under which enteral fluid is delivered from the pouch.

In one case a substantially gas impermeable barrier surrounds the pouch. When the pouch is filled with enteral fluid, the pouch may substantially conform to the shape of the inner surface of the surrounding barrier.

In one case as fluid is delivered from the pouch, a space is formed between the pouch and the barrier.

The barrier may comprise a membrane. The membrane may comprise a laminate including a metallic layer. The membrane may comprise a PET layer.

According to the invention there is provided a portable enteral feeding apparatus comprising a pouch which defines a reservoir for enteral fluid and having an outlet for delivery of enteral fluid from the pouch, and an outlet port, the pouch being formed by an expansile element having an expanded filled configuration and a collapsed configuration, the outlet port comprising a valve and a housing for the valve.

In one case the valve housing is adapted for mounting the expansile element to the housing.

The housing may comprise a mounting feature such as a groove to which the expansile element is mounted.

The apparatus may further comprise a locking element for mounting the expansile element to the mounting feature of the housing.

In one case the valve housing comprises a receiver for the valve. The valve receiver may comprise a ledge for engagement with the valve. The apparatus may further comprise a retainer element for retaining the valve in position in the housing.

In some cases the valve is a zero seal valve such as a slit valve. The valve may comprise an elastomeric material such as silicone.

In some cases the apparatus further comprises an outer cap for the valve housing.

In one embodiment the apparatus further comprises a tubular connector having a spike at a distal end for penetrating the valve and a proximal mounting feature such as a Leur or ENFit for connection to a tube leading to a PEG.

In one embodiment the valve housing comprises a tubular receiving section for the spike and wherein the spike is an interference fit in the tubular receiving section.

In some cases the outlet also provides an inlet for filling the enteral fluid into the expansile element.

The expansion of the expansile element may provide the sole force under which enteral fluid is delivered from the pouch.

The enteral feeding apparatus may further comprise a substantially gas impermeable barrier surrounding the pouch.

In one case the inner barrier has an inner surface which is adapted for contacting with enteral fluid and an outer surface which substantially conforms to the inner surface of the expansile element in the expanded filled configuration.

In one embodiment the inner barrier comprises a membrane. The membrane may comprise PET.

The outer barrier may be formed from a membrane such as a laminate. The final shape may be manufactured from a blank which is sealed along adjoining edges. The barrier may comprise front and rear panels and foldable side panels.

In one case the apparatus is free-standing. The apparatus may comprise a bottom gusset.

In one embodiment the enteral feeding apparatus further comprises a regulator for regulating the flow of enteral fluid from the pouch.

In one case the regulator comprises a flow channel and means for adjusting the bore of the flow channel.

Alternatively or additionally the regulator comprises a friction regulator.

In one embodiment the regulator comprises a coiled tube. There may be a plurality of coiled tubes. The coiled tubes may be configured for engagement with one another to adjust the length of the regulator.

In one case the coil comprises an inlet port having engagement features for engagement with a Leur or ENFit connector.

In one case the coil comprises an outlet port having engagement features for engagement with a Leur or ENFit connector.

In one case a coil may have a side port for delivery directly into the flow line. This may be used for flushing or delivery of a medicament, for example.

In one embodiment the pressure applied by the expansile element in the expanded configuration is from 0.05 to 900 psi (0.000345 to 6.2053 MPa), from 0.05 to 90 psi (0.000345 to 0.62053), from 0.5 to 3.0 psi (0.003447 to 0.0206843 MPa), from 1.0 to 2.5 psi (0.006895 to 0.017237 MPa), or from 1.0 to 2.0 psi (0.006895 to 0.0137895 MPa).

In some embodiments the volume of the expansile element in the expanded filled configuration is from 50 ml to 1000 ml, 250 to 750 ml, 400 to 600 ml, or approximately 500 ml.

In some embodiments the wall thickness of the expansile element in the expanded filled configuration is from 0.01 to 1.0 mm, 0.05 to 1.0 mm, 0.1 to 0.5 mm, or approximately 0.2 mm.

In one embodiment the secant modulus of elasticity of the expansile element in the expanded filled configuration at a circumferential extension of from 100% to 1000% is from 0.1 to 4.5 MPa.

In one case the secant modulus of elasticity of the expansile element in the expanded filled configuration at a circumferential extension of from 300% to 500% is from 0.1 to 1.6 MPa, from 0.1 to 1.0 MPa, or approximately 0.5 MPa.

In some embodiments the apparatus is configured to deliver a flowrate of from 1 to 1500 ml/hr, 50 to 1000 ml/hr, 250 to 750 ml/hr or approximately 500 ml/hr.

In one case the expansile element comprises a silicone elastomer.

The expansile element may comprise a two component silicone rubber that vulcanises at room temperature.

The enteral feeding apparatus may further comprise an indicator such as a smart label or a Near Field Communication tag.

In some cases the enteral feeding apparatus further comprises a sensor for detecting properties associated with enteral food.

In some cases the sensor may, for example be a weight sensor, a volume sensor, a pressure sensor, and/or a flow sensor.

In one embodiment the outlet port comprises a seal. The seal may be of a pierceable material such as a foil.

In some embodiments the delivery port comprises engagement features for engagement with a Leur or ENFit connector.

There may be a removable cap for the outlet port.

In one case the portable enteral feeding apparatus comprises an inlet port for delivery of enteral fluid into the pouch. The inlet port may comprise engagement features for engagement with a Leur or an ENFit connector. The inlet port may comprise a seal.

In some cases the inlet port comprises a valve.

In one case the inlet port comprises a non-return valve.

In one embodiment the portable enteral feeding apparatus comprises mounting means for mounting the apparatus to a stand.

In one case the apparatus comprises a spacer located within the elastomeric element. The spacer may comprise an elongate rod.

The invention also provides an enteral feeding system comprising an enteral feeding apparatus of the invention and a feeding tube having a Leur or ENFit connector at a first end for connection to the pouch outlet and a Leur or ENFit connector at a second end for connection to a PEG fixture.

The system may comprise a regulator for regulating the flow of enteral fluid from the pouch.

The invention also provides an enteral feeding system comprising an enteral feeding apparatus of the invention and a regulator for regulating the flow of enteral fluid from the pouch.

In one case the regulator comprises a flow channel and means for adjusting the bore of the flow channel.

Alternatively or additionally the regulator comprises a friction regulator.

In one embodiment the regulator comprises a coiled tube.

The enteral feeding system may comprise a plurality of coiled tubes.

In one case the coiled tubes are configured for engagement with one another to adjust the length of the regulator.

In some cases the coil comprises an inlet port having engagement features for engagement with a Leur or ENFit connector.

In some cases the coil comprises an outlet port having engagement features for engagement with a Leur or ENFit connector.

According to the invention there is provided a portable enteral feeding apparatus comprising a pouch which defines a reservoir for enteral fluid, an outlet port for delivery of enteral fluid from the pouch, the apparatus having an expansile element which is adapted to provide the force by which enteral fluid is delivered from the pouch through the outlet port.

In one embodiment the pouch comprises the expansile element, the pouch having an expanded filled configuration and a collapsed configuration.

The expansile element may comprise an expansile polymeric material.

In some embodiment the enteral feeding apparatus further comprises a substantially gas impermeable barrier surrounding the pouch.

In one case, when the pouch is filled with enteral fluid, the pouch substantially conforms to the shape of the inner surface of the surrounding barrier.

As fluid is delivered from the pouch, a space may be formed between the pouch and the barrier.

In some embodiments the barrier comprises a membrane such as a gas impermeable membrane, for example, a metallic foil.

In one embodiment the apparatus is free-standing.

The apparatus may have a base support.

In some embodiments the enteral feeding apparatus further comprises an indicator such as Near Field Communication tag.

In one embodiment the enteral feeding apparatus further comprises a sensor for detecting properties associates with enteral food.

The sensor may be a weight sensor, a volume sensor and/or a pressure sensor.

In one case the outlet port comprises a seal. The seal may be of a pierceable material such as a foil.

In one embodiment the delivery port comprises engagement features for engagement with a Leur or ENFit connector for connection to an enteral tube feeding fixture.

In one case the portable enteral feeding apparatus comprises a removable cap for the outlet port.

In some embodiments the portable enteral feeding apparatus comprises an inlet port for delivery of enteral fluid into the pouch.

The inlet port may comprise engagement features for engagement with a Leur or an ENFit connector.

In one case the inlet port comprises a seal.

The portable enteral feeding apparatus may comprise mounting means for mounting the apparatus to a stand.

The invention also provides an enteral feeding system comprising an enteral feeding apparatus of the invention and a feeding tube having a Leur or ENFit connector at a first end for connection to the pouch outlet and a Leur or ENFit connector at a second end for connection to a PEG fixture.

In one embodiment the enteral feeding system further comprises a regulator for regulating the flow of enteral fluid to the PEG.

BRIEF DESCRIPTION OF THE DRAWINGS

The invention will be more clearly understood from the following description thereof, given by way of example only, in which:—

DETAILED DESCRIPTION

Figure 1:
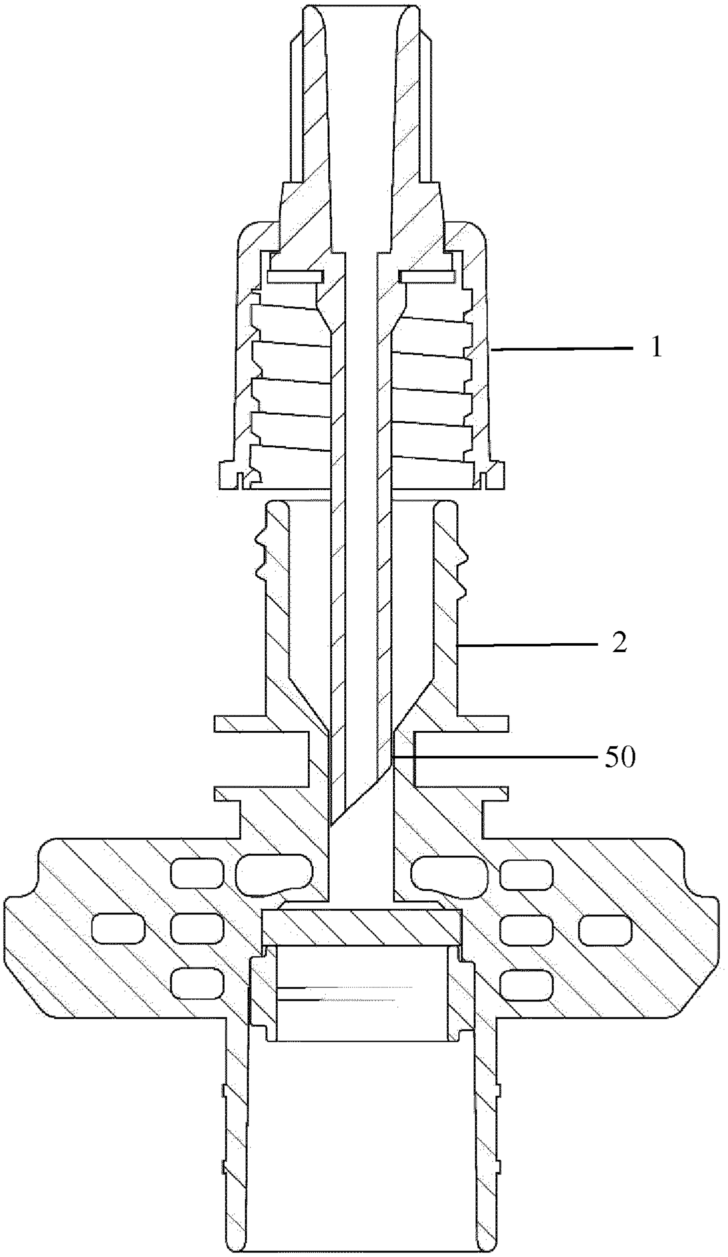
FIG. 1 is a cross sectional view of an outlet port of an enteral feeding apparatus according to the invention.

Referring to the drawings, there is illustrated an outlet port for a portable enteral feeding apparatus. The outlet port comprises a valve 6 and a housing or spout 2 for the valve 6. In this case, the feeding apparatus comprises an expansile pouch 10 which has an expanded filled configuration and a collapsed configuration. In this case there is no mechanical means, such as a pump, to deliver the enteral feed from the pouch. The expansion of the expansile element, on filling, provides the sole force under which enteral fluid is delivered from the pouch.

The weldable spout has a self-sealing mechanism, used in filling and dispensing enteral feed from an elastomeric pouch. The valve seal mechanism is activated by pushing a spike through the valve seal. The spout comprises:

spout main body 2;

elastomeric valve 6;

valve retainer ring 7;

optional cap 5.

Materials

The spout main body 2 can be made from any weldable thermoplastic, but is primarily made from Polyolefins, Polyethylene or Polypropylene.

The elastomeric valve 6 can be made from any elastomeric material but is primarily made from silicone of the range 20-60 A durometer.

The valve retainer ring 7 can be made from any thermoplastic, but is primarily made from Polyolefins, Polyethylene or Polypropylene.

FIG. 1 shows a cut section of the valve housing or spout 2 and the spike connector 1 in the process of being connected to each other. The spike member 1 is entering the high tolerance region 50 of the spout main body in this figure. There is an interference fit as the spike and the body mates. This interference fit between the spike and the body is in the order of 0.1 mm and is used to seal and prevent egress of food from the system while the spout/spike connector threads are in engagement and the spike is being pierced through the valve. In the event that the valve slit does not fully seal around the spike, the interference fit between the neck ID of the spout and the spike OD seal the food in the pouch.

The interference fit between the spike and the ID of the spout main body is an integral part of connecting the spout a feed set or given set. This applies to both cross fit and round spike connectors. The interference fit should be in the order of ≤0.1 mm. In other words the ID of the spout main body should be −0.1 mm<the diameter of the connector spike. This provides both an interference fit and a wiper seal effect as both are fitted together.

Figure 2:
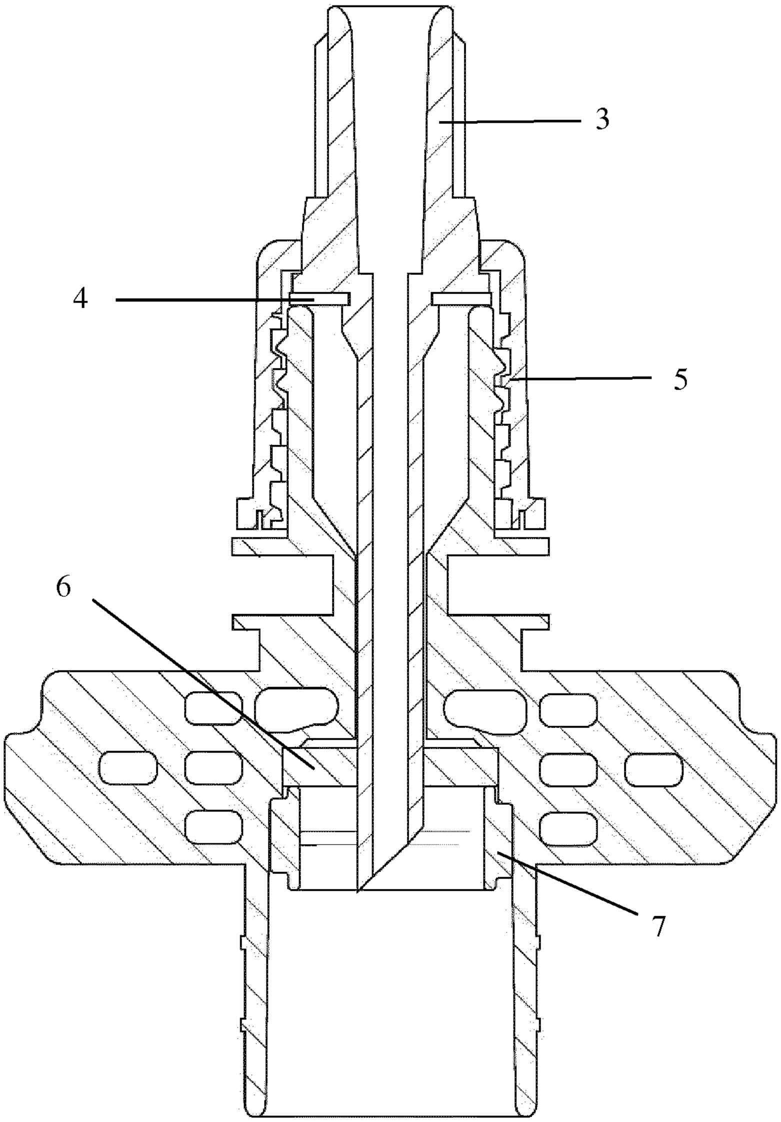
FIG. 2 is a cross sectional view of the outlet port of FIG. 1 with a spike extending through a valve.

FIG. 2 shows a cut section of the spout 2 and the spike connector 1 fully connected to each other. The spike connector comprises a spike 3 which is snap fitted to a cap 5 to allow the cap to be treaded on to the spout. When connected to the spout, a washer 4 is placed between the tip of the spout 2 and the spike 3. The spout is made up of 3 components the spout body 2, a silicone valve 6 and a valve retainer ring 7. The valve 6 is held in place by the valve retainer ring 7 that is held by a slight ledge or protrusions from the spout body ID (not visible in drawing).

Figure 3:
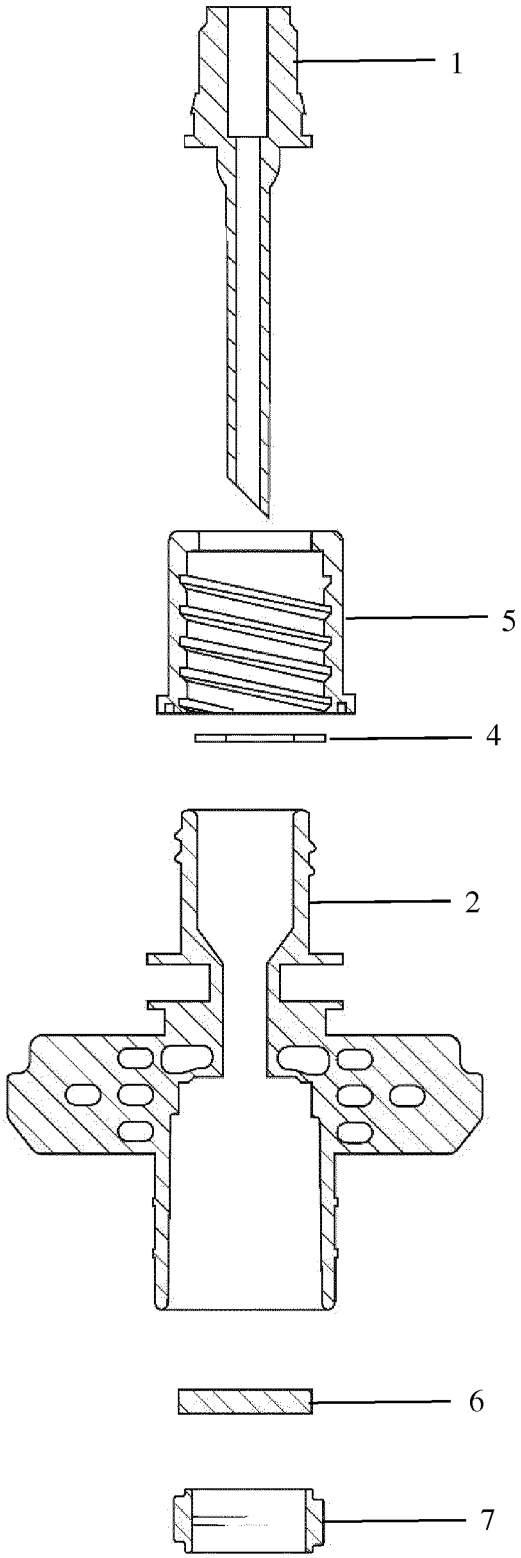
FIG. 3 is an exploded view of the outlet port.

FIG. 3 shows a cut section of the spout 2 and the spike connector 1 in an exploded view. The image shows the spike 1, the cap 5, the poly foam washer 4, the spout 2, a silicone valve 6 and a valve retainer ring 7.

Figure 4:
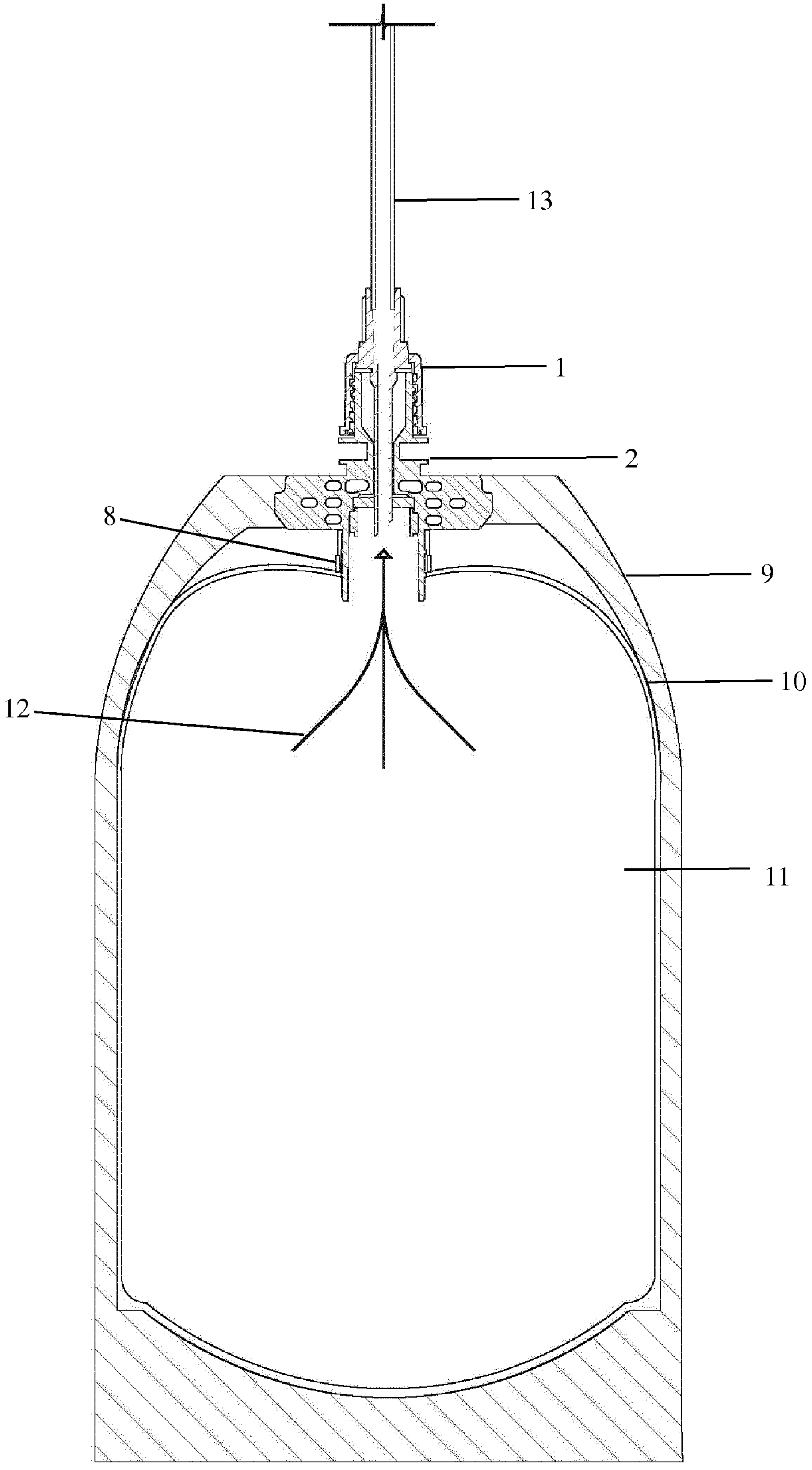
FIGS. 4 to 6 are views of an enteral feeding pouch with the outlet port of FIGS. 1 to 3.

FIG. 4 shows the food pod in its entirety when in use. The food pod has a surrounding membrane of foil 9, an elastomeric membrane 10 which is connected to the spout 2 via a cable tie 8. The arrows 12 show the direction of the fluid 11 which then passes through the spout 2 and the spike connector 1 and into the tubing 13 to be expelled to the patient.

The valve should withstand a pressure of ≥1 psi.

Figure 5:
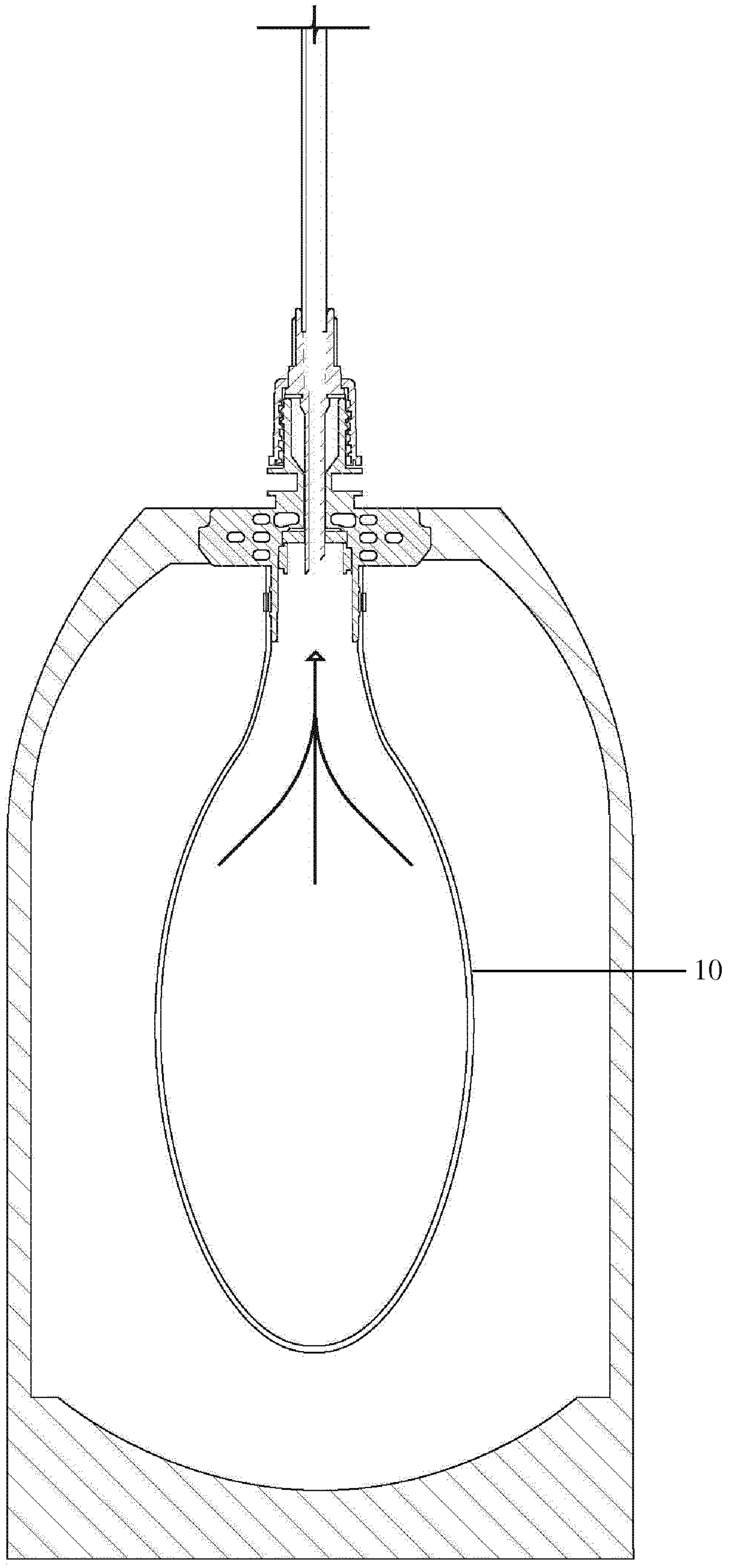

FIG. 5 shows the pressure of the elastomer pouch 10 being released and shrinking as enteral food is delivered.

Figure 6:
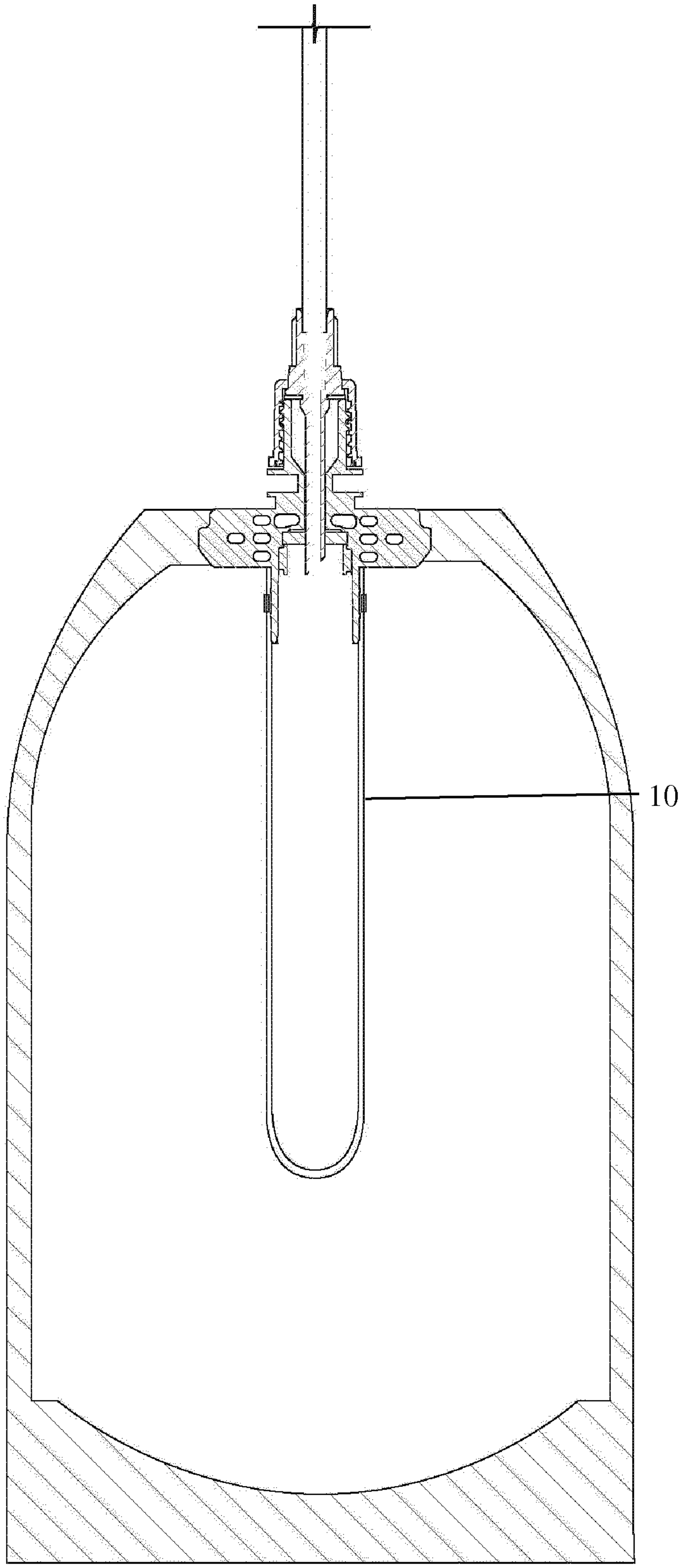

FIG. 6 shows the pressure of the pouch 10 fully released and the elastomer pouch 10 has returned to its original shape.

Figure 7:
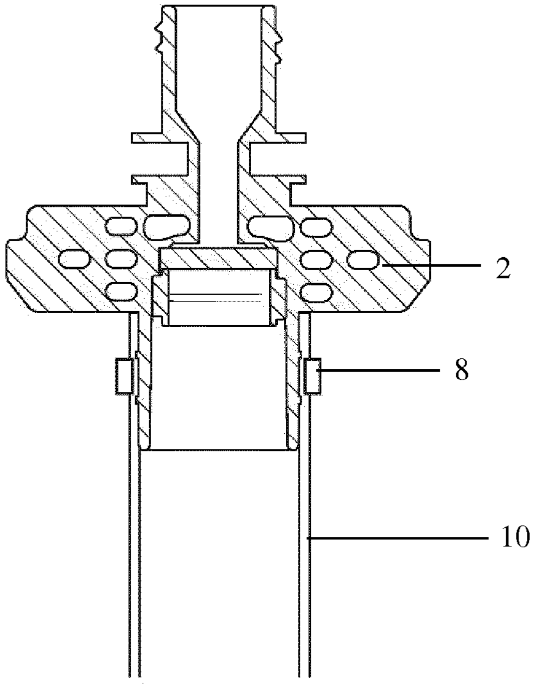
FIGS. 7 to 9 are cross sectional views of alternative outlet ports according to the invention.

FIG. 7 shows the pouch 10 being connected to the base of the spout 2 by a cable tie 8.

Figure 8:
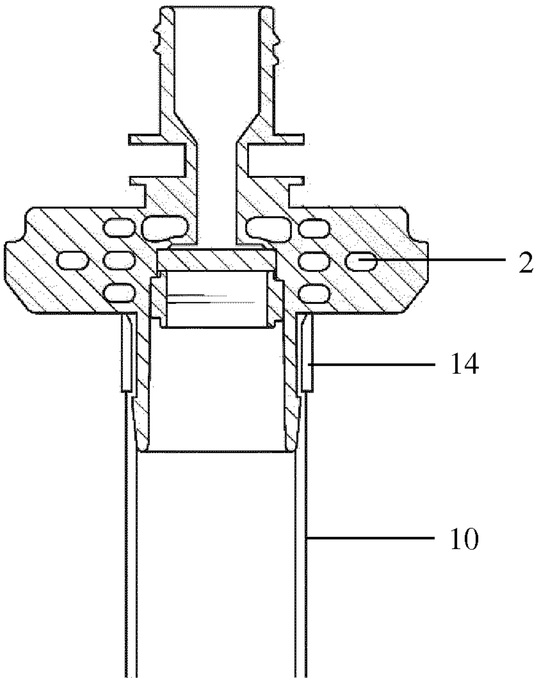

FIG. 8 shows the pouch 10 being connected to the spout 2 by a plastic fitment ring 14.

Figure 9:
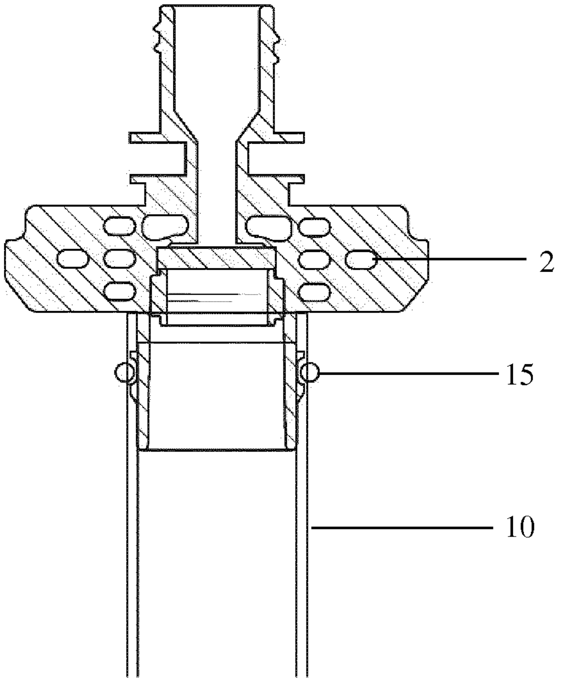

FIG. 9 shows the pouch 10 being connected to the spout 2 by an o-ring 15.

The spout main body has a fixation feature to aid attaching and securing the elastomeric pouch to the spout main body.

Figure 10:
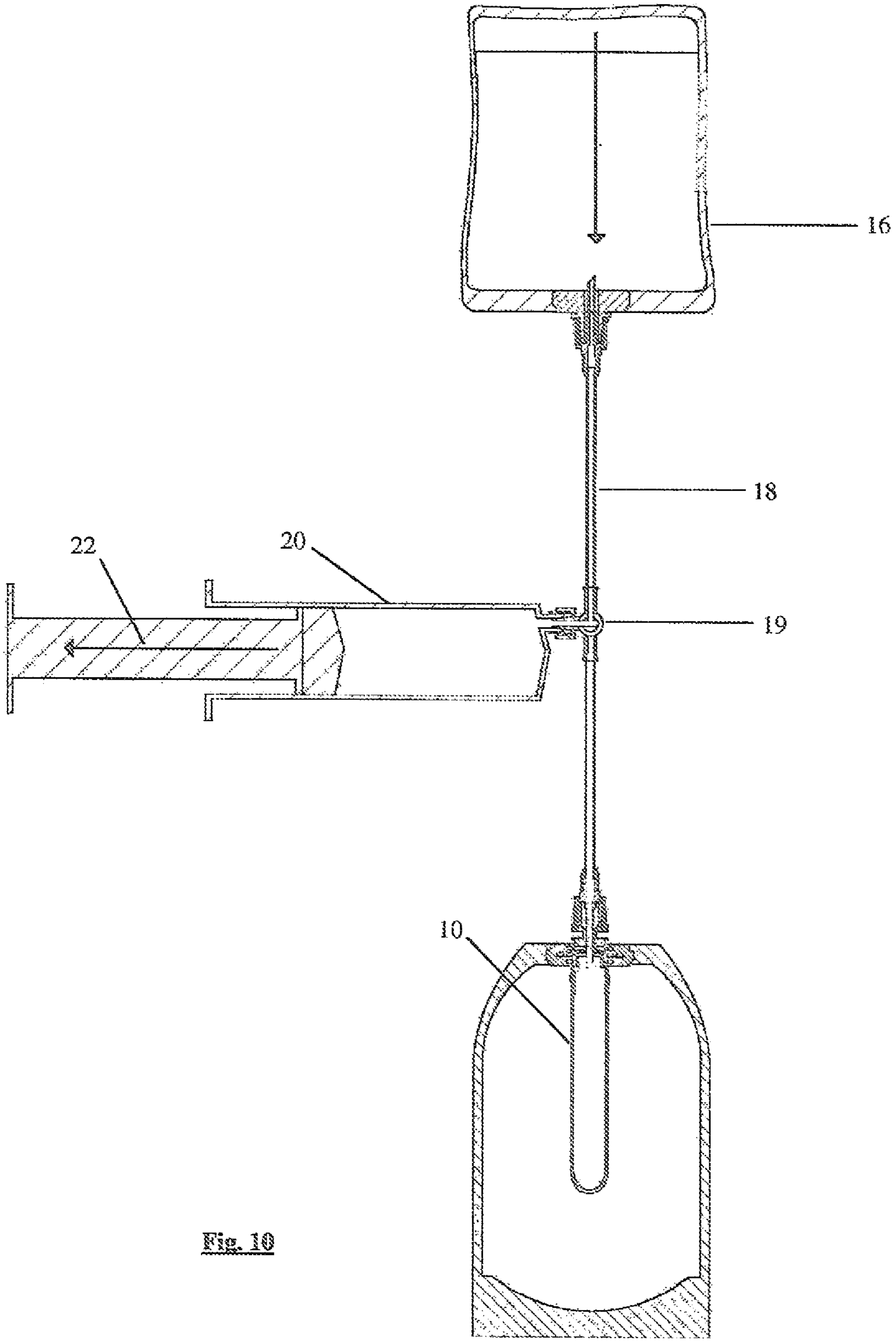
FIGS. 10 and 11 illustrate one system for filling the expansile pouch with enteral fluid.

FIG. 10 shows one setup for closed filling of the pouch 10. The nutritional feed packaging 16 is connected to a filling set 18 via a crossfit spike 23. An ENFit Syringe 20 is connected to a stopcock 19. In this image the nutritional feed is shown being pulled from the feed packaging 16 via the syringe 20 as a force is being pulled by the syringe as indicated by the arrow 22. The stopcock 10 is set so that the flow only can enter the syringe 20.

Figure 11:
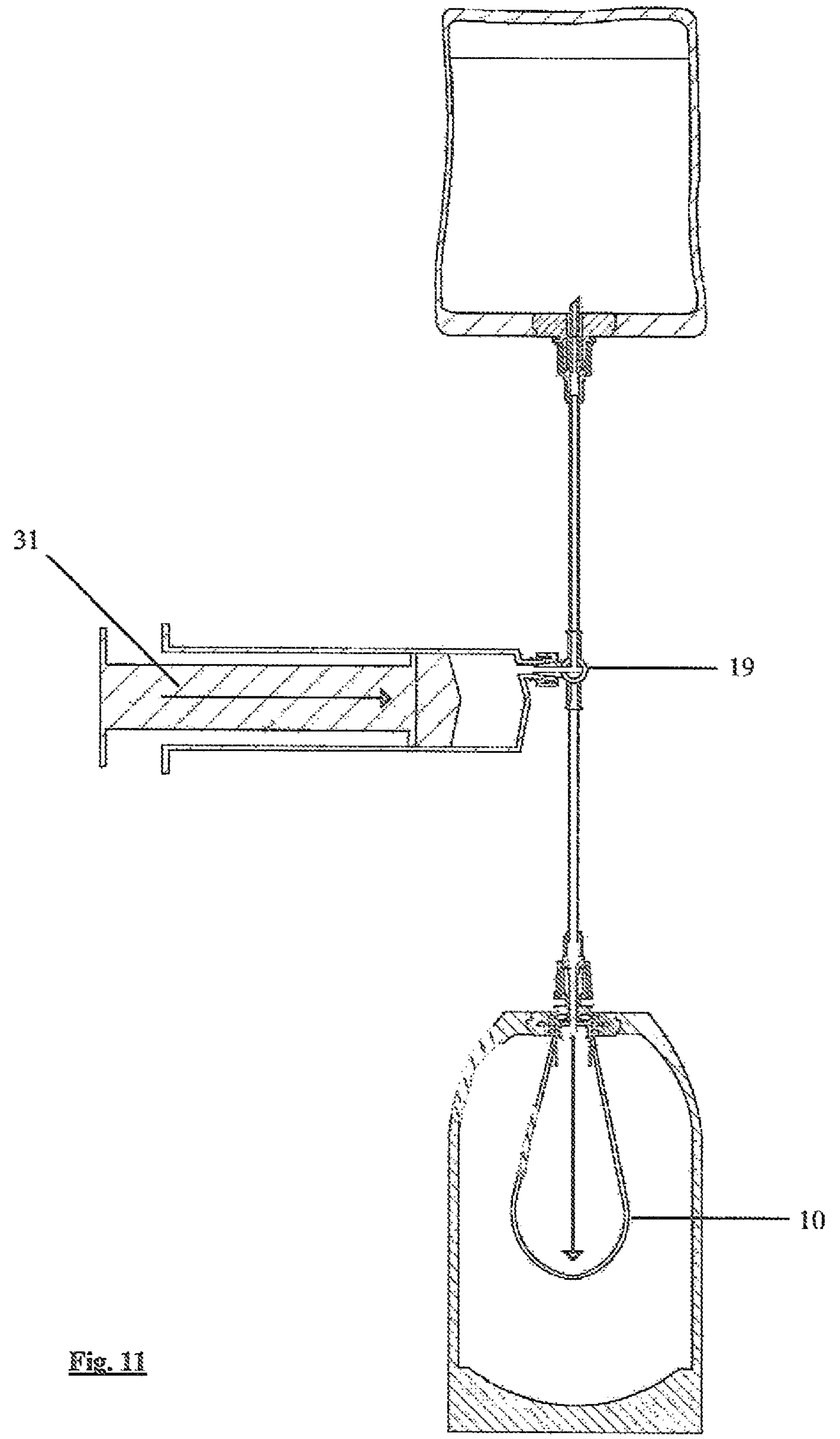

FIG. 11 shows the second step in the closed filling process. The syringe 20 is forced forward via the user indicated by the arrow 31. The nutritional feed is then forced through the stopcock 19 and directly into the pouch 10 which then expands. The stopcock 19 has switched direction due to user interaction, directing the flow towards the pouch 10.

Figure 12:
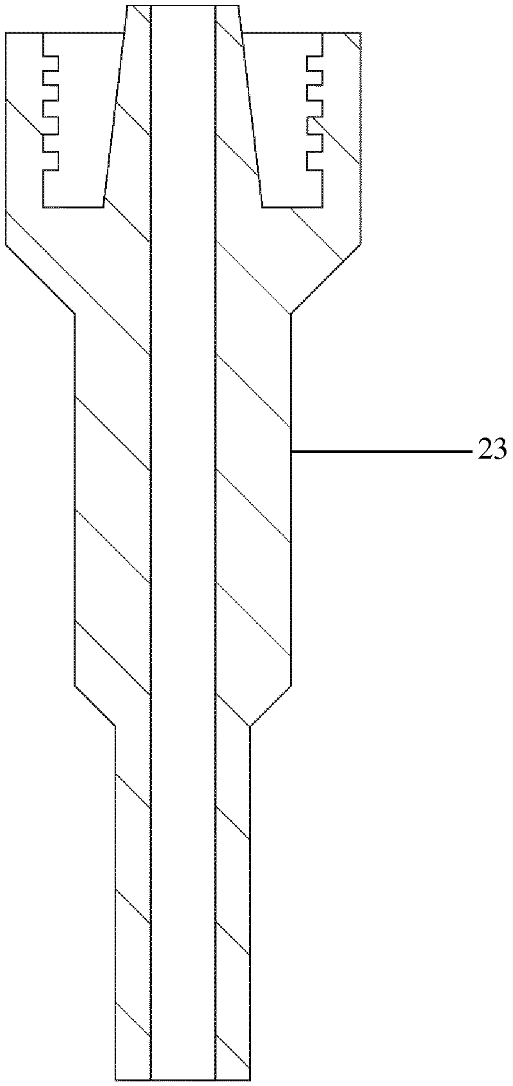
FIG. 12 is a cross sectional view of a filling spike.
Figure 13:
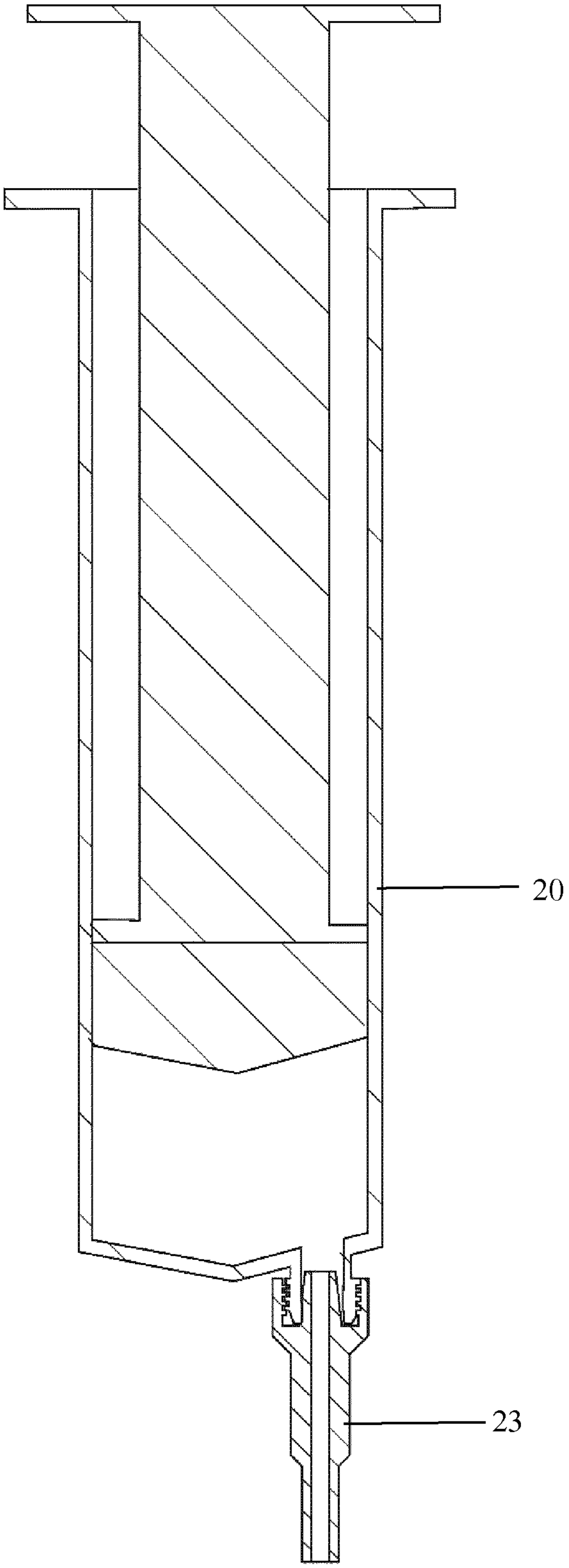
FIG. 13 shows the filling spike mounted to a syringe.

FIG. 12 shows a filling spike 23. The filling spike 23 is compatible with the tip of the syringe 20 tip. FIG. 13 shows the filling spike 23 connected to the syringe 20.

Figure 14:
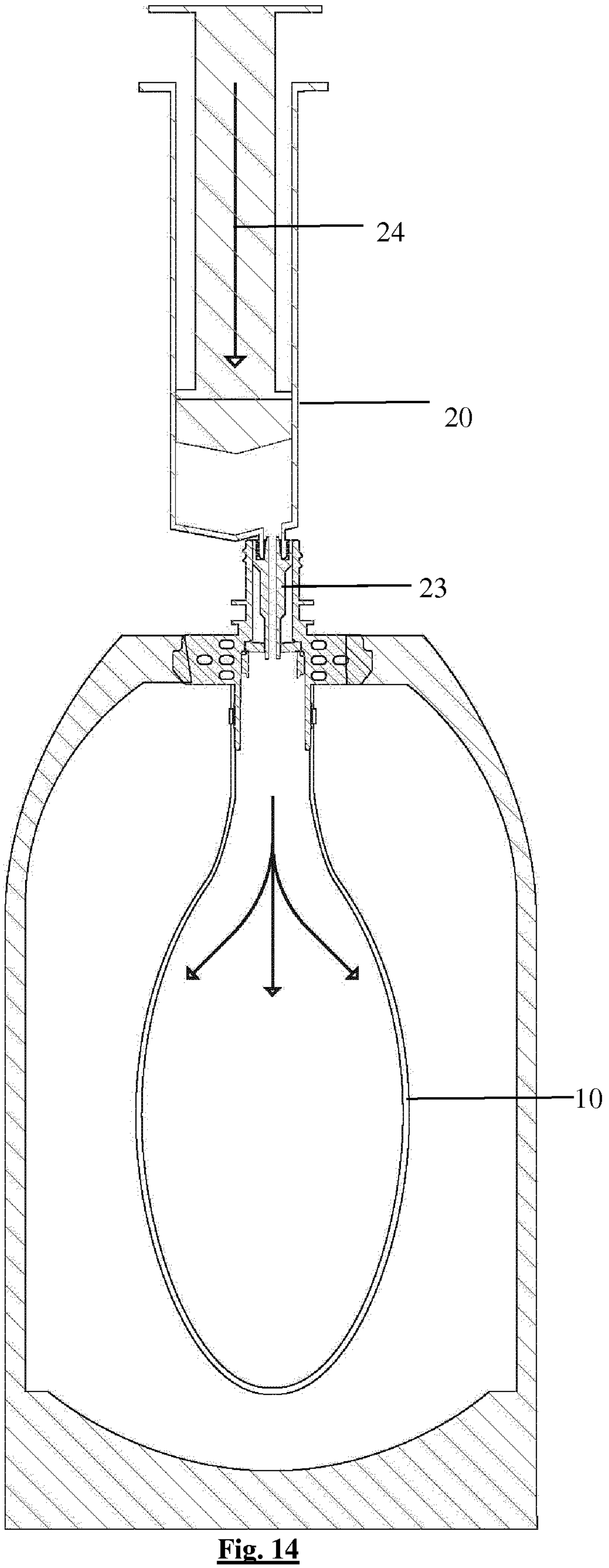
FIGS. 14 and 15 illustrate the filling spike system in use filling an expansile pouch.
Figure 15:
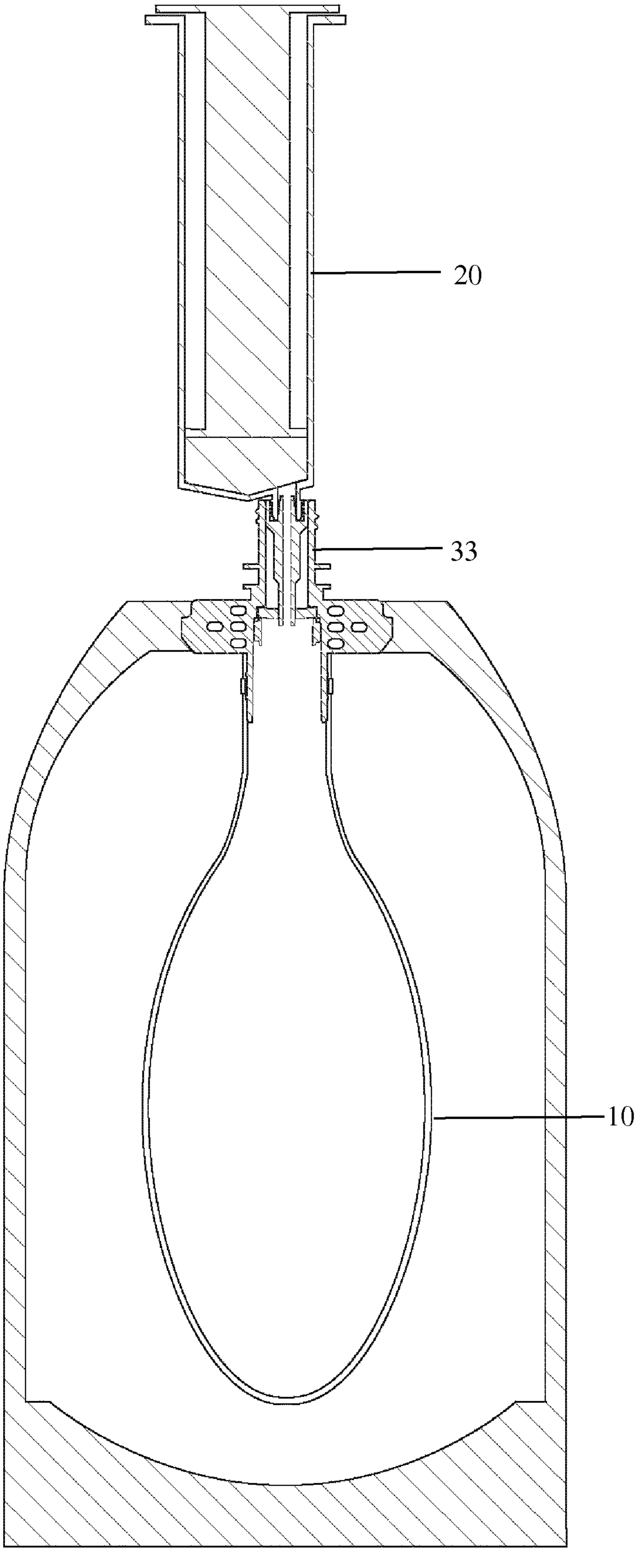

FIG. 14 shows the filling process using the filling spike 23. The user fills the syringe 20 with the filling spike 23 connected. The filling spike 23 is then inserted into a spout 33 (which is slightly modified to have a wider channel/ID). When connected, pressure 24 is then exerted in the syringe 20 which pushes the nutritional feed into the pouch 10, forcing it to expand. FIG. 15 shows the pouch 10 partially filled.

Figure 16:
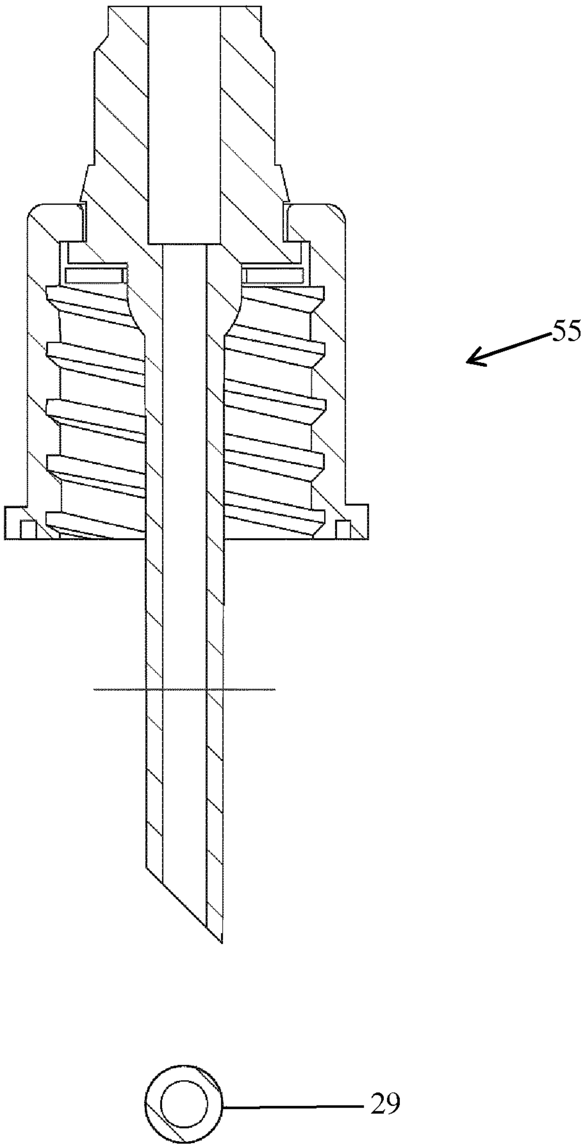
FIGS. 16 and 17 illustrate conventional connectors for use with different spikes.

FIG. 16 shows another connector 55 intended to be used with a cut section of the spike 29.

Figure 17:
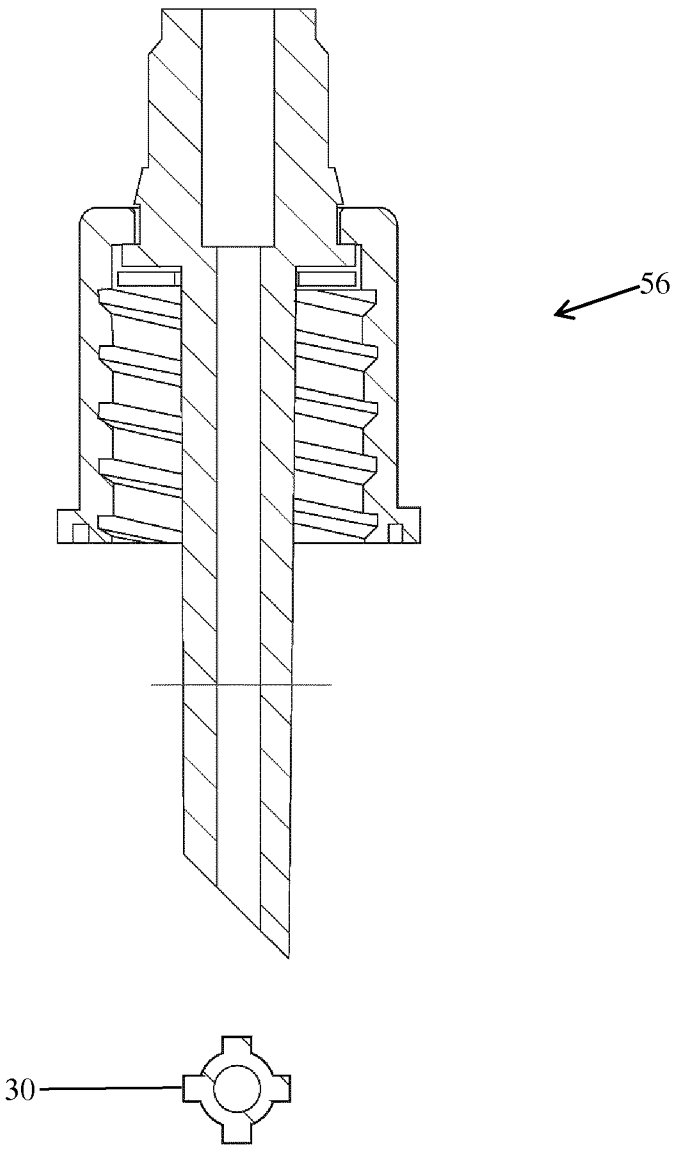

FIG. 17 also shows another connector 56 intended to be used with a cut section of the spike 30.

The valve may or may not have an incision to aid the valve in entry. The incision can be made of a single or many incisions, it may be partially or fully pierced. The incision is not limited to straight line incisions, it maybe half moon shaped.

Figure 18:
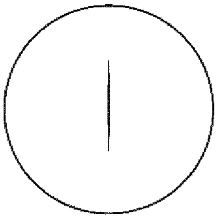
FIGS. 18 to 25 illustrate various valves.

FIG. 18 shows single slit.

Figure 19:
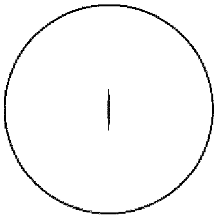

FIG. 19 shows a single slit with smaller length.

Figure 20:
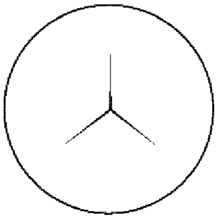

FIG. 20 shows a three way slit.

Figure 21:
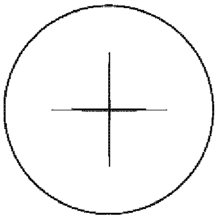

FIG. 21 shows a four way slit.

Figure 22:
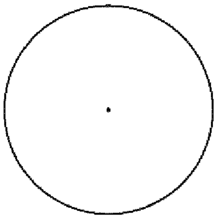

FIG. 22 shows a single dot punch.

Figure 23:
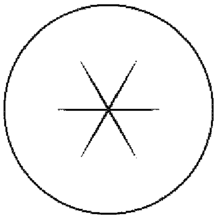

FIG. 23 shows a six way slit.

Figure 24:
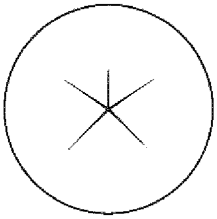

FIG. 24 shows a five way slit.

Figure 25:
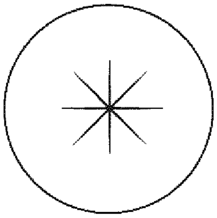

FIG. 25 shows an eight way slit.

Referring to FIGS. 27 to 41, there is illustrated a portable enteral feeding apparatus 100 according to the invention. The apparatus 100 for PEG feeding comprise a pouch 101 which defines a reservoir for enteral feed. The pouch 101 has an outlet 102 for delivery of enteral feed from the pouch. An outlet spout 105 has a pouch spigot 106 for connection to the pouch outlet 102 and a connector spigot 107 which is adapted for mounting of a connector shaft. A valve 109 is mounted to the spout. The connector spigot 107 has mounting means for mounting a connector shaft 110 of a PEG feeding system. The spout is configured so that when the connector shaft 110 extends through the valve 109, the connector shaft 110 can be secured to the spout. However, there is an interlock to prevent fixing of the connector shaft 110 to the connector spigot 107 if the connector shaft is not extended through the valve 109. This ensures that there can be no flow from the pouch unless the connector is correctly connected to the spout.

In this case the connector spigot comprises a plurality of grooves and the interlock comprises an end stop in at least one of the grooves.

Referring in particular to FIGS. 36 to 41 the connector spigot 107 comprises four grooves, each groove being 90° circumferentially spaced-apart from an adjacent groove, two of the grooves which are spaced-apart by 180° have end stops. The two longer grooves are 120 and the two shorter grooves are 122. The shorter grooves 122 have end stops 124, 125 respectively.

The connector shaft 110 in this case is an ENFit cross connector shaft having two long ribs 130, 131 and two shorter ribs 132, 133. The two longer ribs 130, 131 have leading edges which penetrate through a slit in the valve 109. The shorter ribs 132, 133 engage against the end stops 124, 125 in this configuration as illustrated particularly in FIGS. 38 and 39. The connector shaft 110 has a channel 140 through which enteral fluid can flow when the connector shaft is in the correctly aligned configuration.

Figure 40:
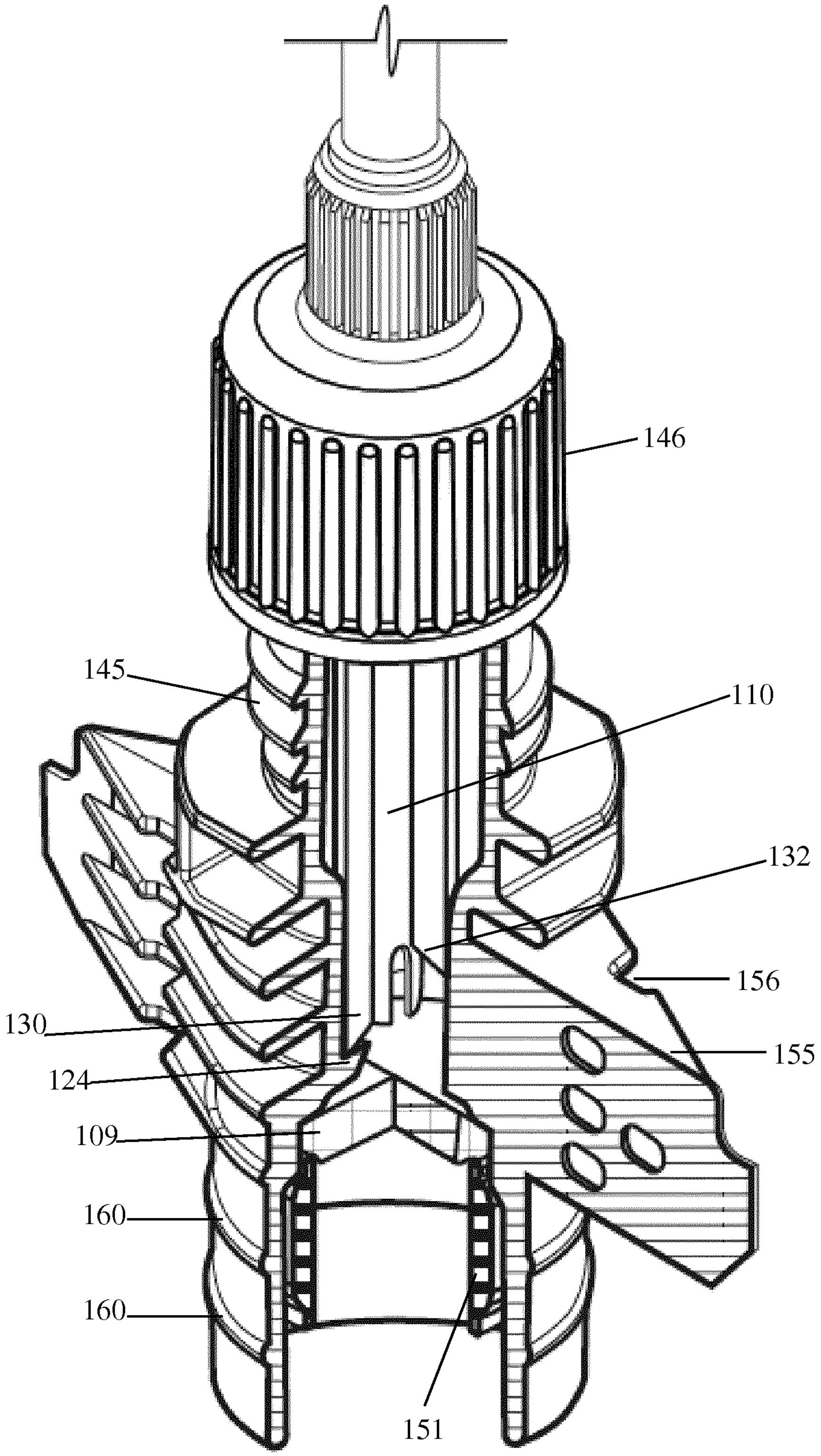
FIGS. 40 and 41 are views similar to FIGS. 38 and 39 but with the connector shaft not correctly aligned and prevented from passing through the valve.
Figure 41:
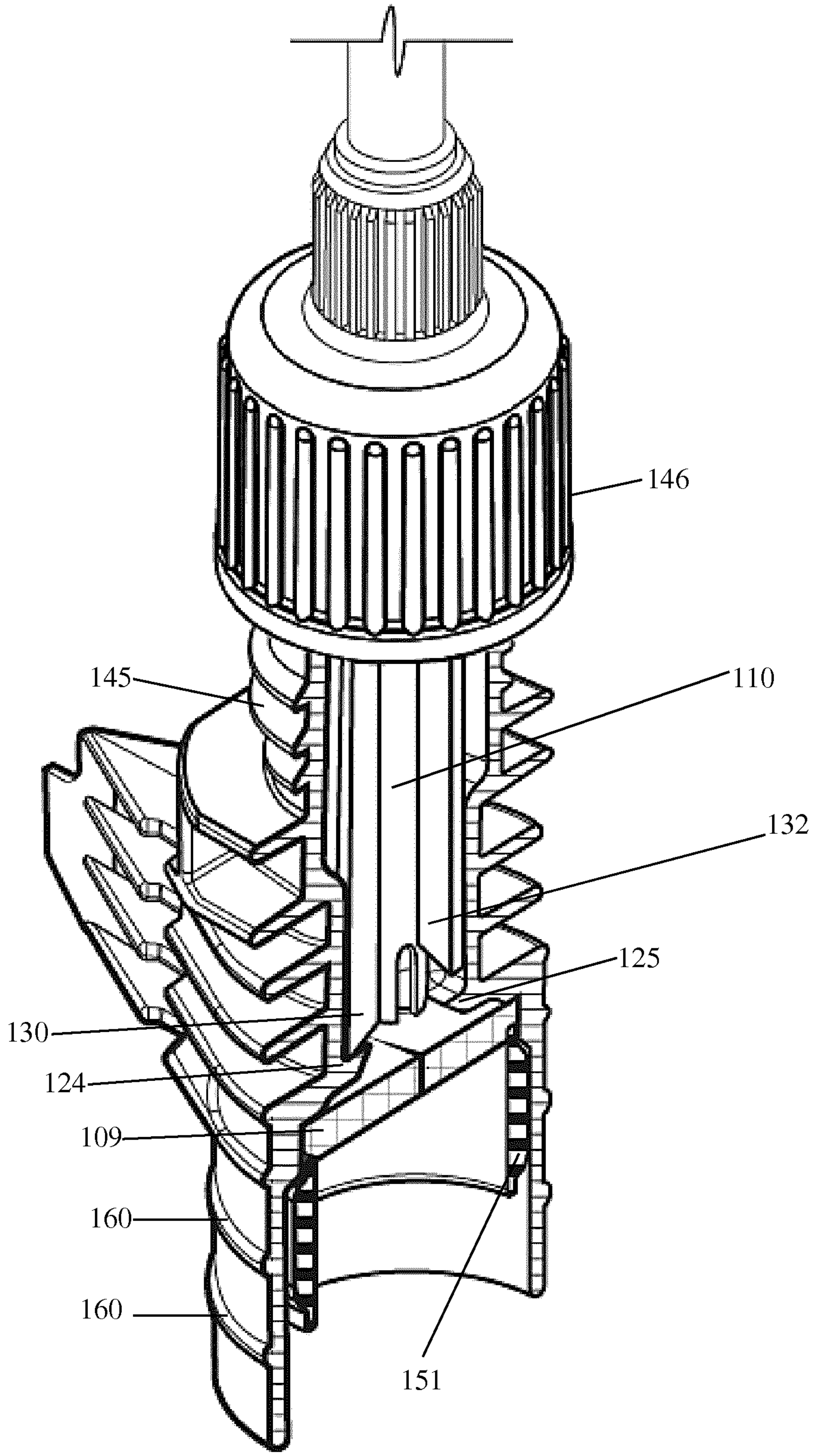

If the connector shaft 110 is turned though 90°, the longer ribs 130, 131 will be aligned with the short grooves 122, 123 and the leading edges of the long ribs 130, 131 will be prevented from advancing any further by the end stops 124, 125 as illustrated particularly in FIGS. 40 and 41. This interlock prevents fixing of the connector shaft 110 to the connector spigot 107 and thereby ensures that there can be no flow in this incorrect configuration.

The connector spigot 107 of the spout 105 has screw threads 145 which engage with corresponding screw threads on a cap 146 of the connector. The cap 146 is attached to the connector shaft 110 by snap fitting. The cap 146 is adapted to screw onto the connector spigot 107. However, the screw threads 145 are positioned so that the cap 146 will only engage when the connector shaft 110 has extended through the valve 109. In this way a further interlock is provided to prevent operation of the device if the connector shaft is not correctly inserted.

The spout 105 comprises a receiver, in this case a ledge 150, against which the valve 109 is engaged. A retaining ring 151 is snap-fitted into the spout to retain the valve 109 position.

In this case the valve 109 is a single slit zero seal valve which may be of a suitable elastomeric material such as silicone with a durometer in the range of 20 to 60 A.

The mounting of the valve 109 allows the valve to flex during penetration and removal of the Crossfit spike. This ensures that a seal is maintained and that no leakage occurs.

Figure 26:
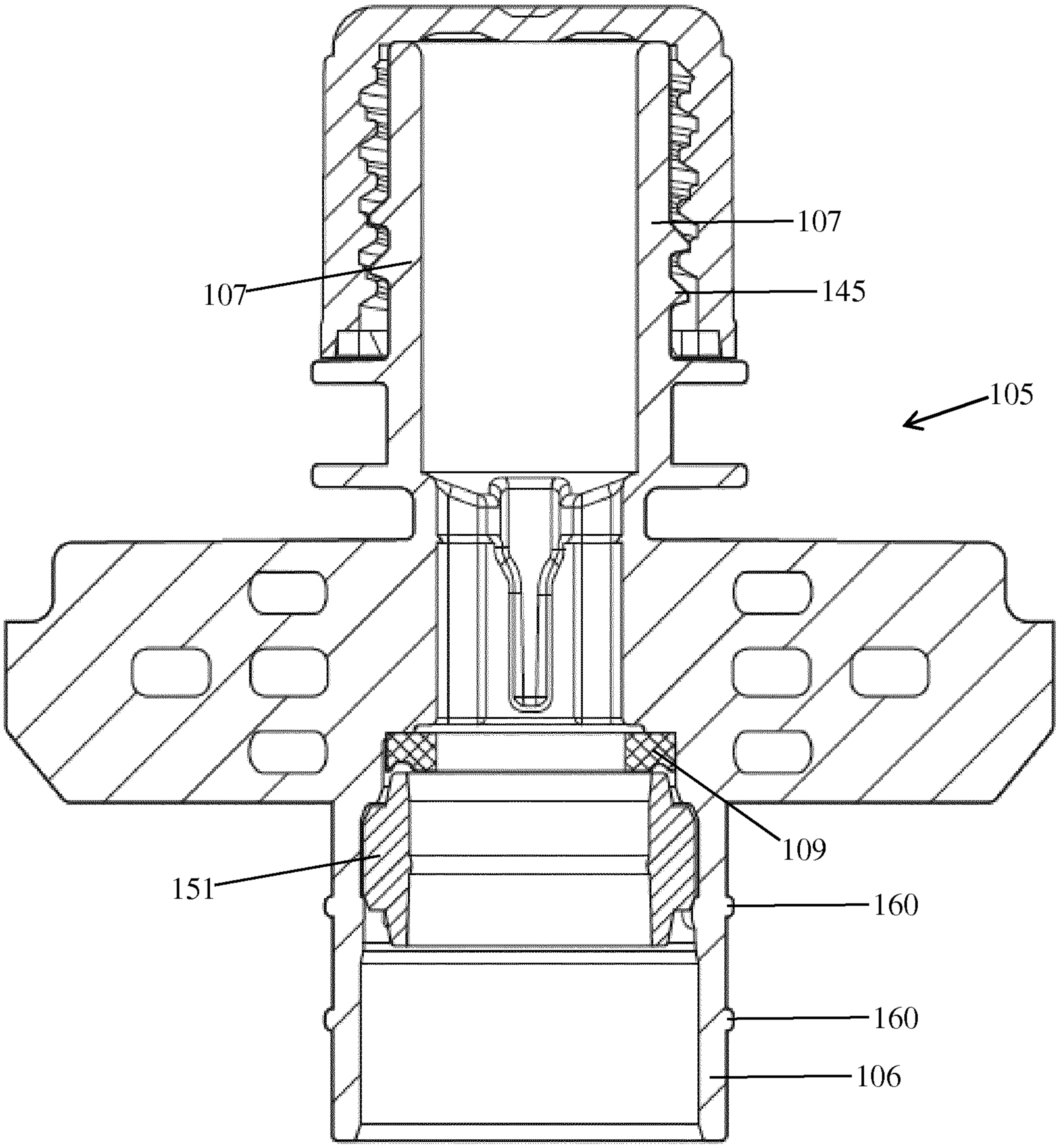
FIG. 26 is a cross sectional view of another spout according to the invention.
Figure 27:
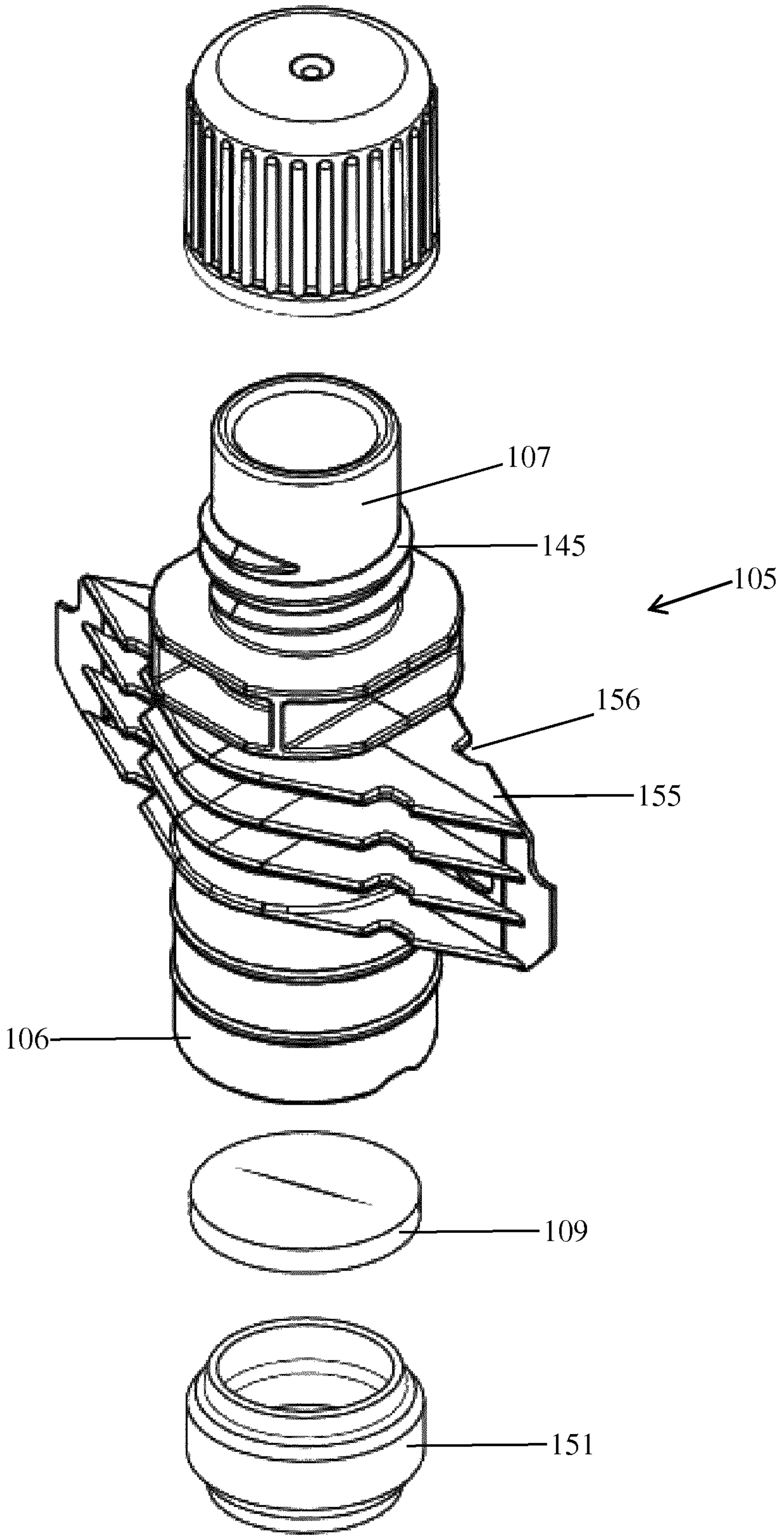
FIG. 27 is an exploded view of the spout of FIG. 26.
Figure 28:
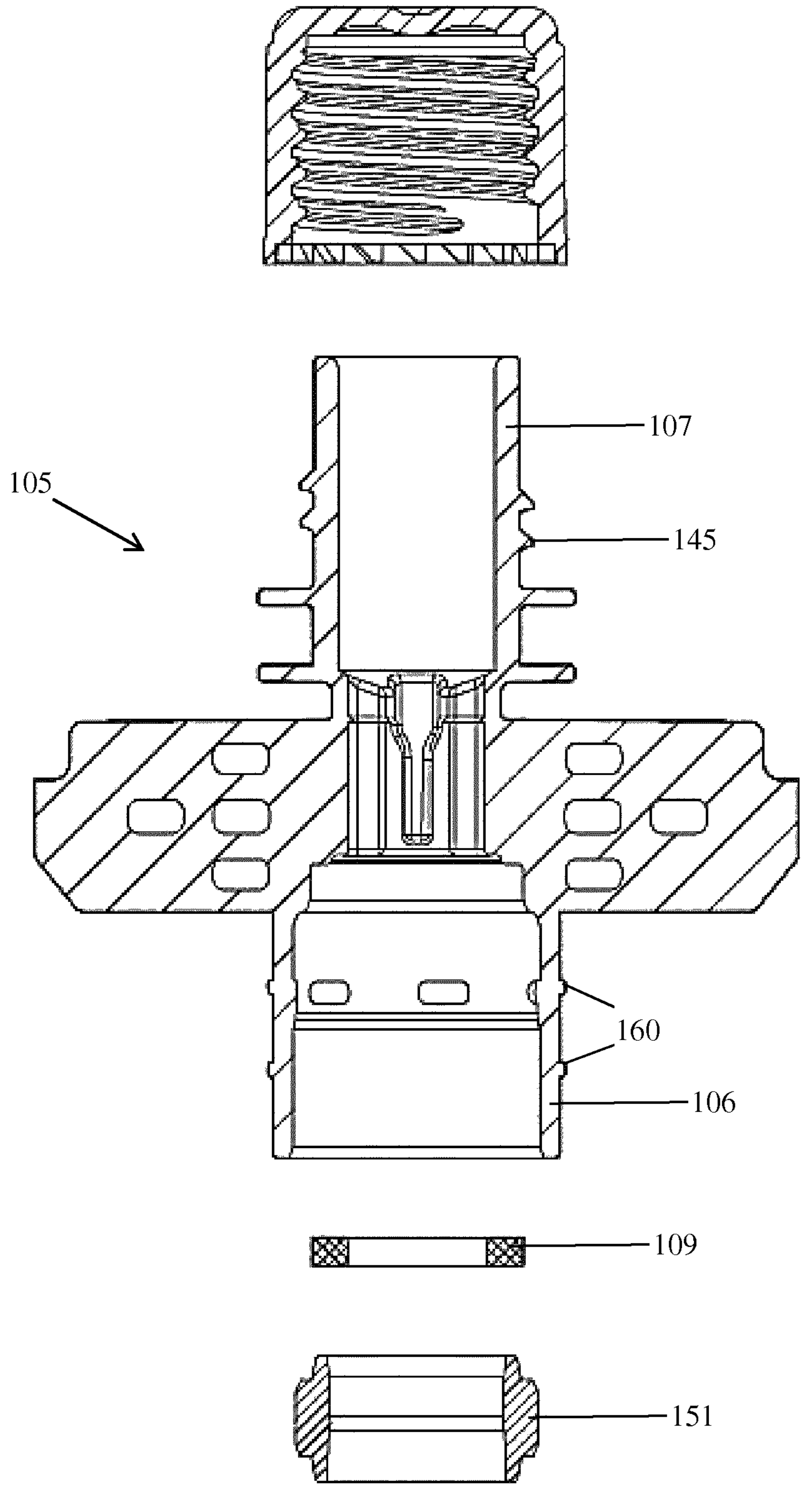
FIG. 28 is an exploded cut section of the spout.

FIGS. 26 to 28 are views of a cut-section of the spout 105 showing cap 108, weld spout 105, silicone valve 109 and retaining ring 151.

Figure 29:
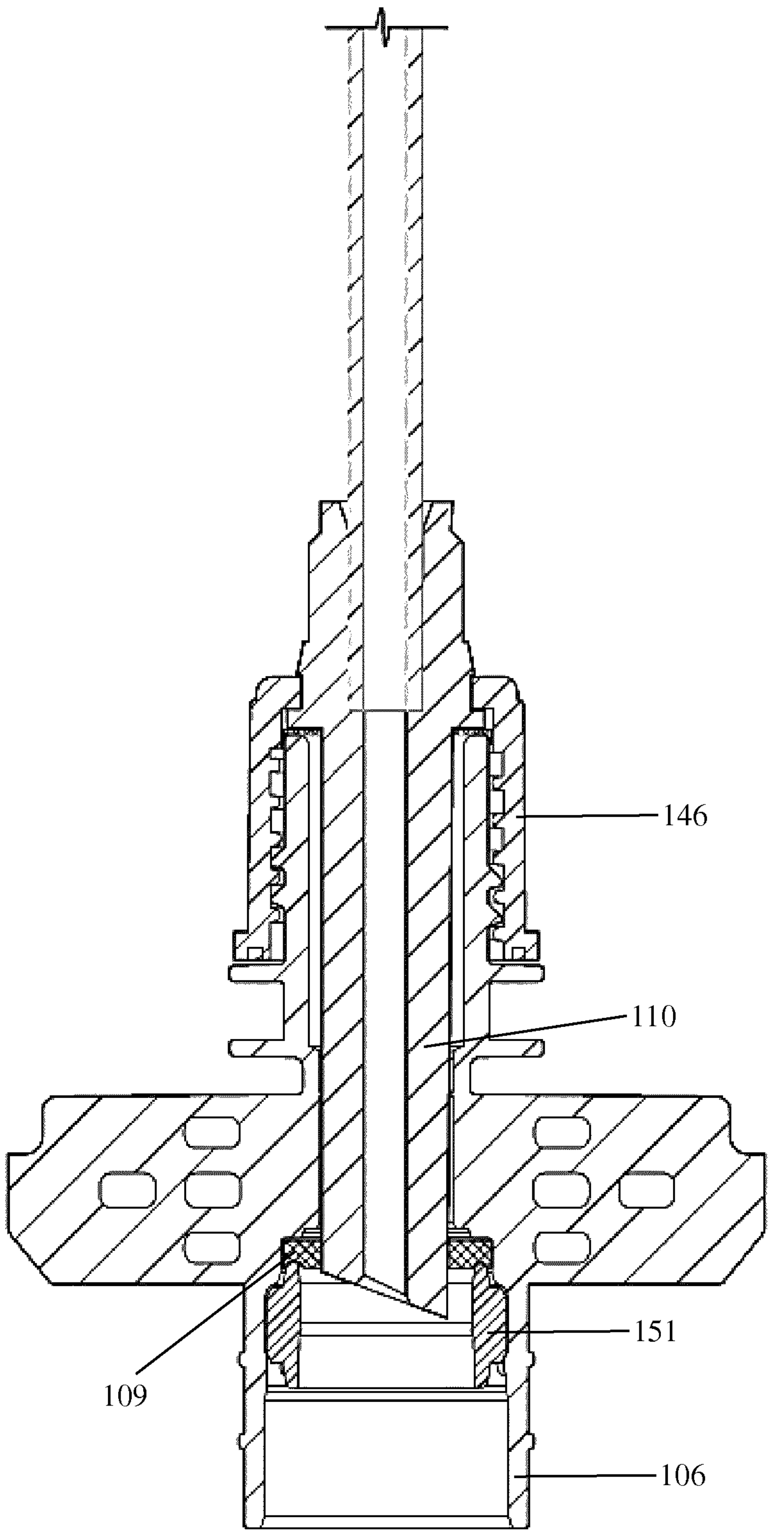
FIG. 29 is a cross sectional view of the spout with a connector shaft.

FIG. 29 is a cut section of the spout 105 connected to an ISO18250-3 connector shaft 110. This view shows the valve 109 being opened allowing fluid to pass through the tubing set.

Figure 30:
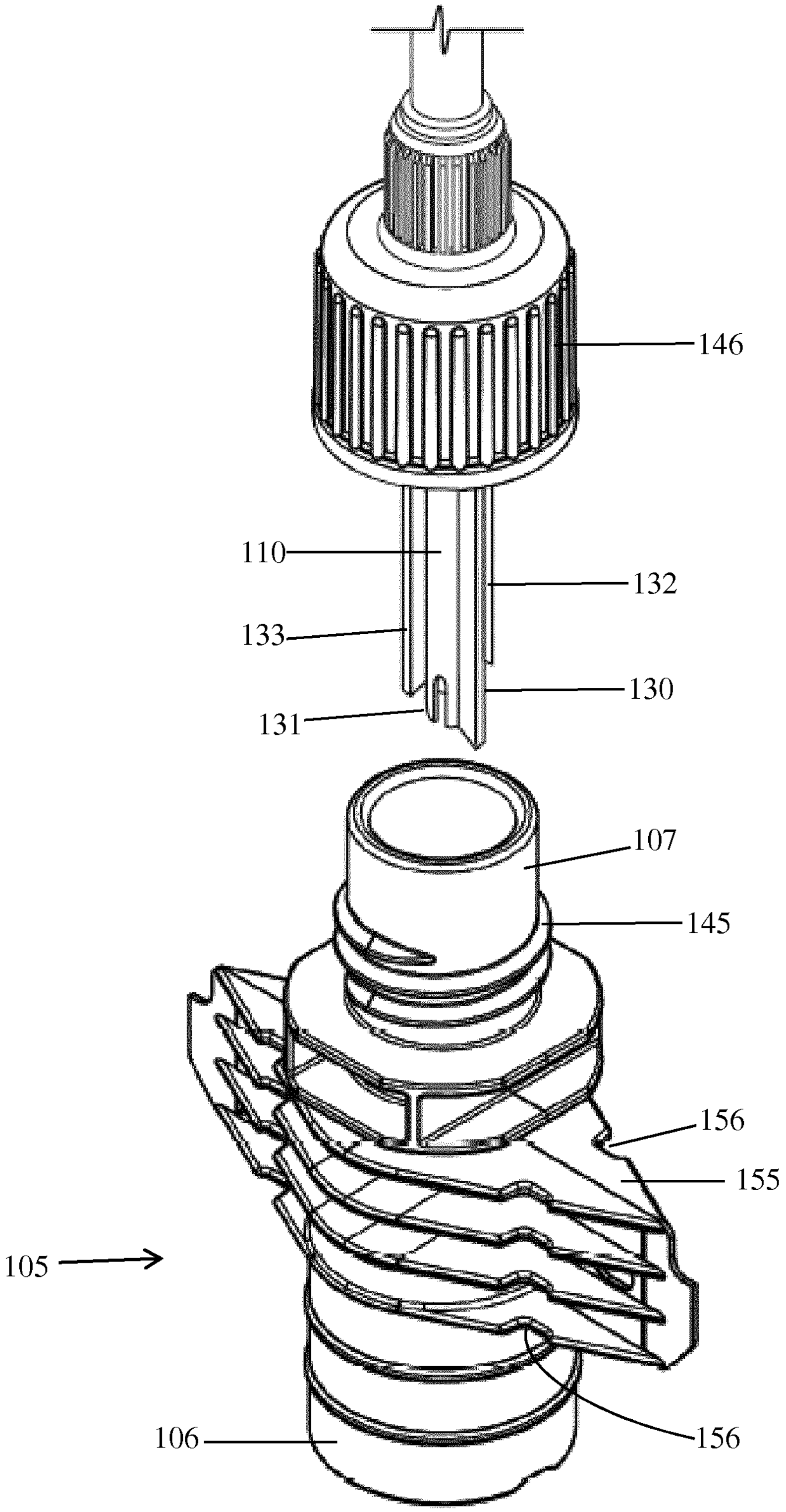
FIG. 30 is an isometric view of the spout and a connector shaft.
Figure 31:
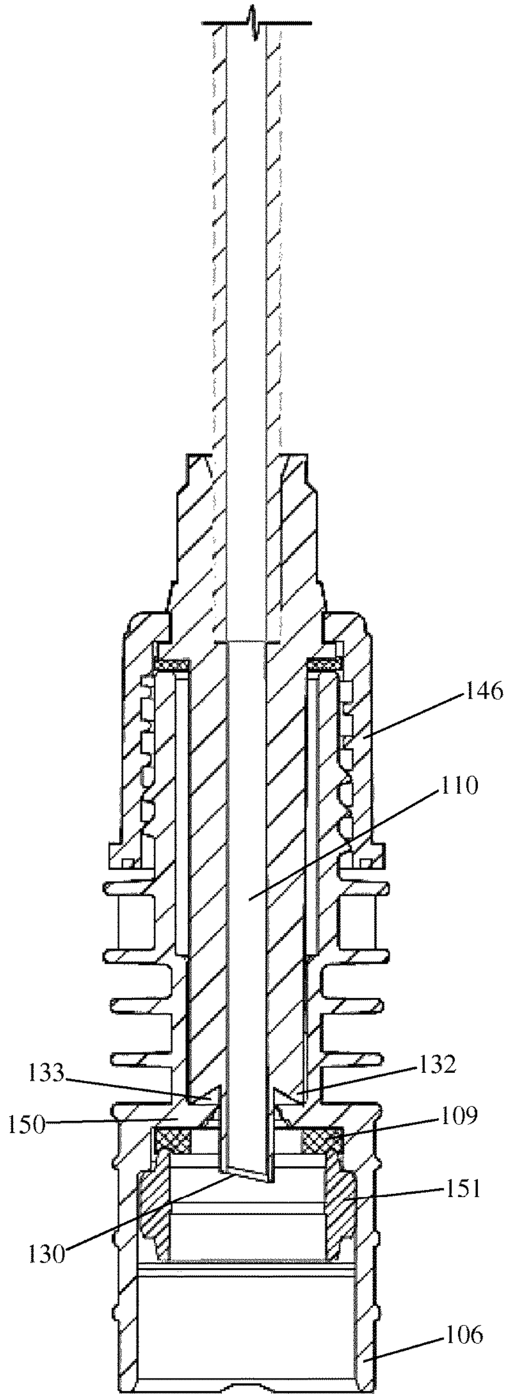
FIG. 31 is a cross sectional side view with the connector shaft in a correct alignment with the spout.

FIGS. 30 and 31 are views of the assembled spout and the connector shaft 110 aligned correctly as per FIG. 29.

Figure 32:
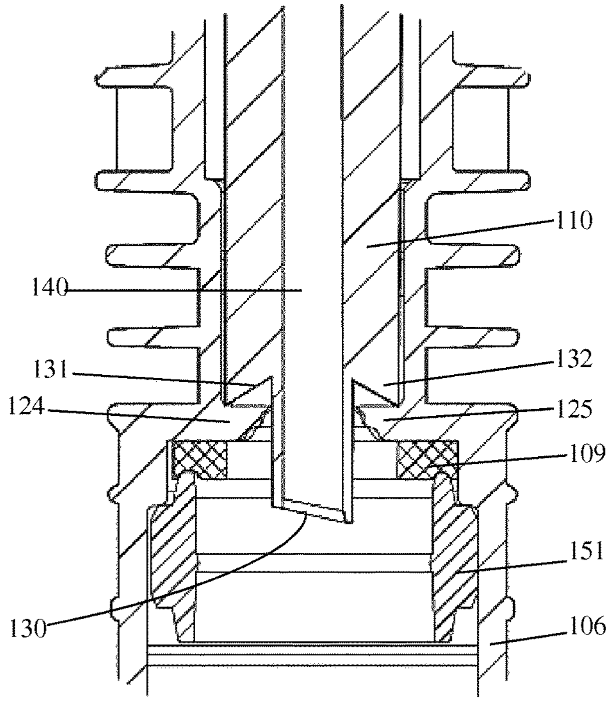
FIG. 32 is an enlarged view of a detail of the connector shaft tip and spout.

FIG. 32 is an enlarged view of part of FIG. 31. This shows the detail around the end stop/blockers 124, 125. The end stops 116 prevent the connector shaft 110 passing through the valve 109.

Figure 33:
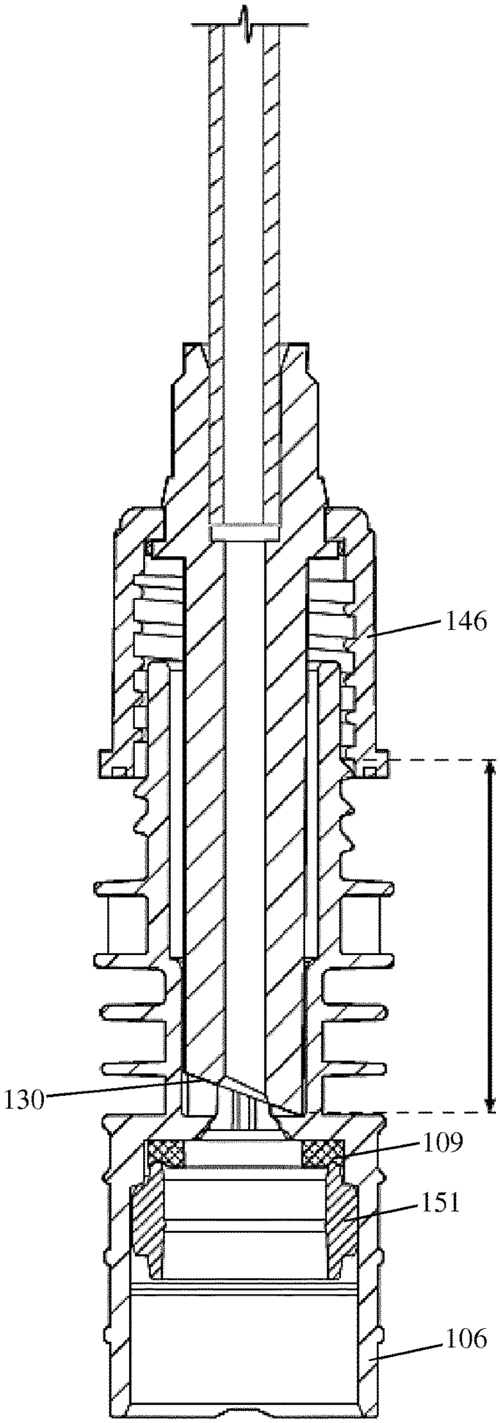
FIG. 33 is a cross sectional view of a connector shaft not correctly aligned with the spout.

FIG. 33 also shows connector shaft 110 being inserted in the incorrect position. The end stops 124, 125 prevent the spike going any further and damaging the valve 109. The end stops 124, 125 are placed at a distance that does not allow the threads on the connector shaft 110 to connect with the threads on the spout. This ensures that no torque can be generated to break through the end stops 124, 125.

Figure 34:
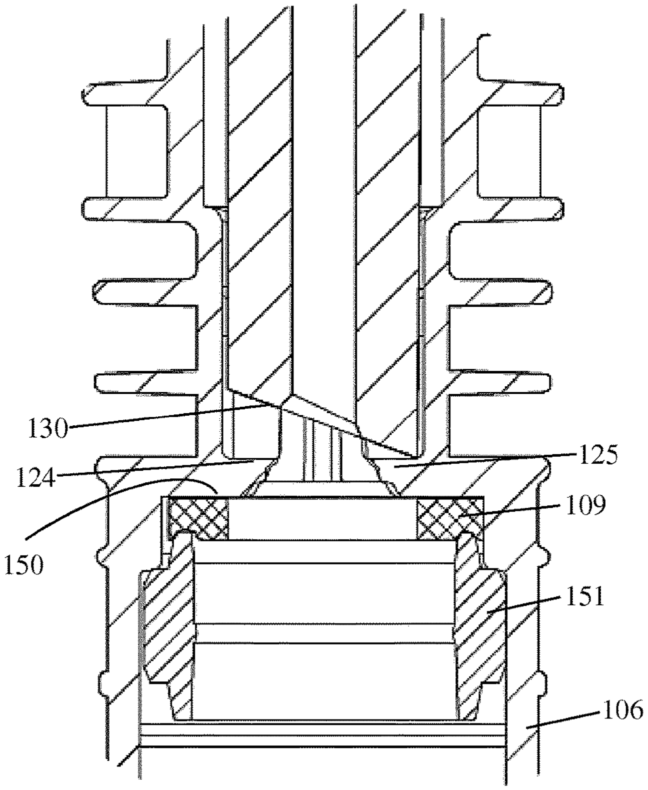
FIG. 34 is an enlarged view of a detail of the connector shaft tip and spout in the configuration of FIG. 33.

FIG. 34 is a detailed view of FIG. 33 on the connector shaft 110 and the interaction with the end stops 124, 125.

Figure 35:
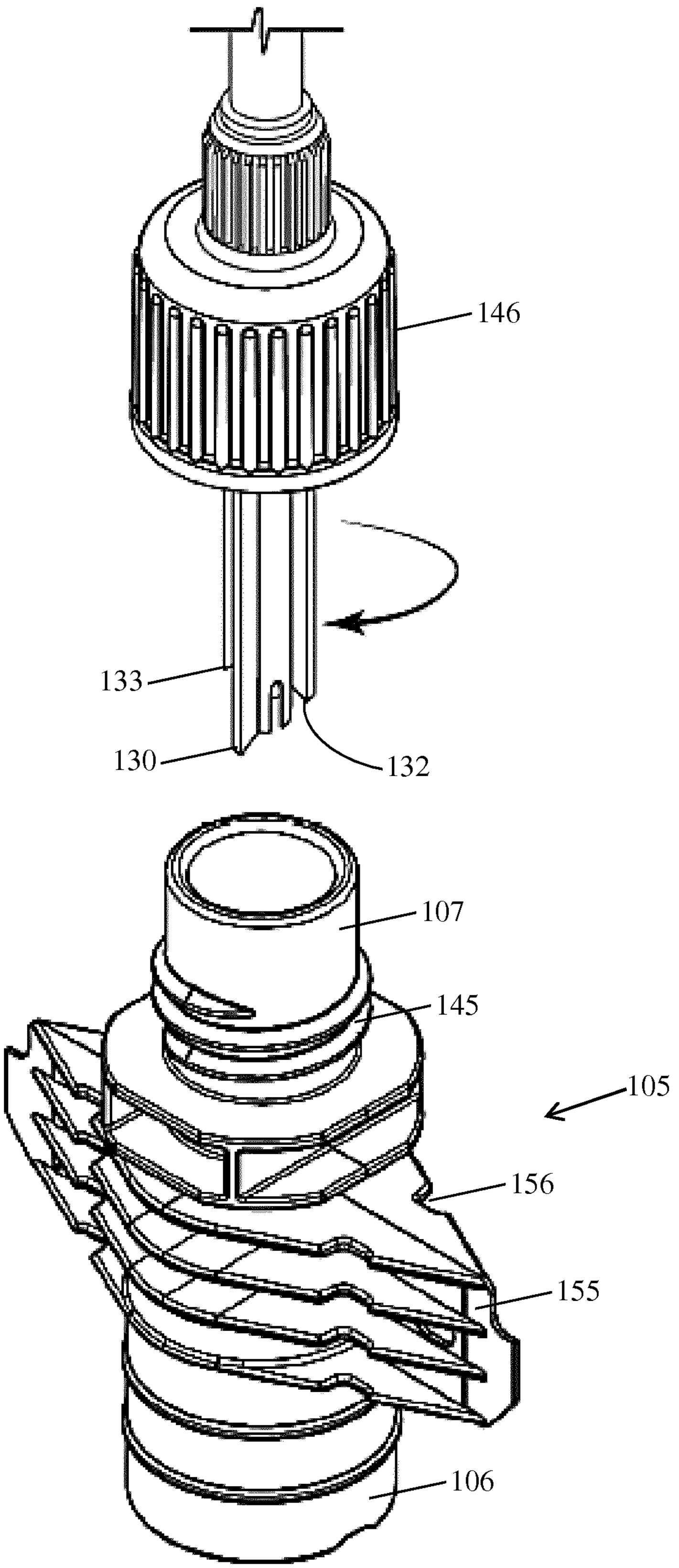
FIG. 35 is an isometric view illustrating misalignment of the connector shaft and spout.
Figure 36:
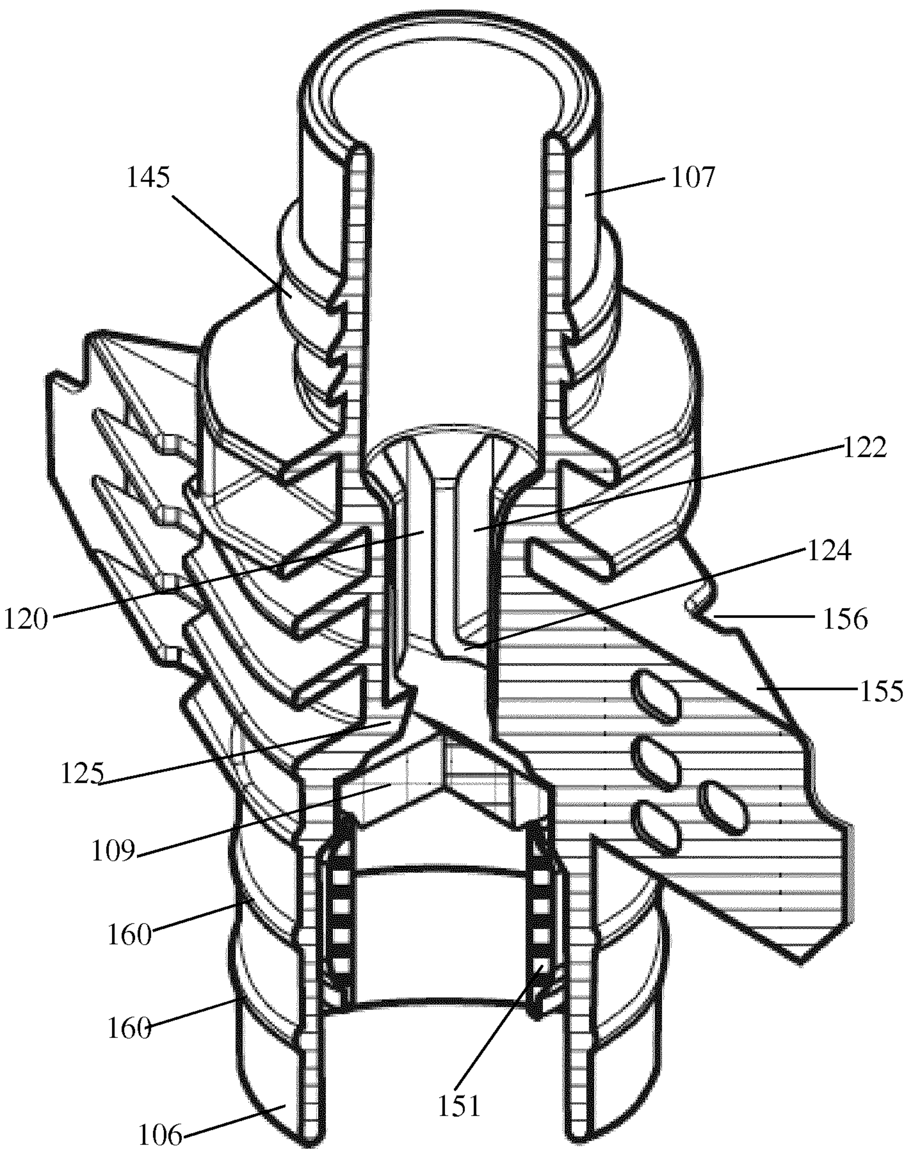
FIG. 36 is a partially cut-away view of a spout.
Figure 37:
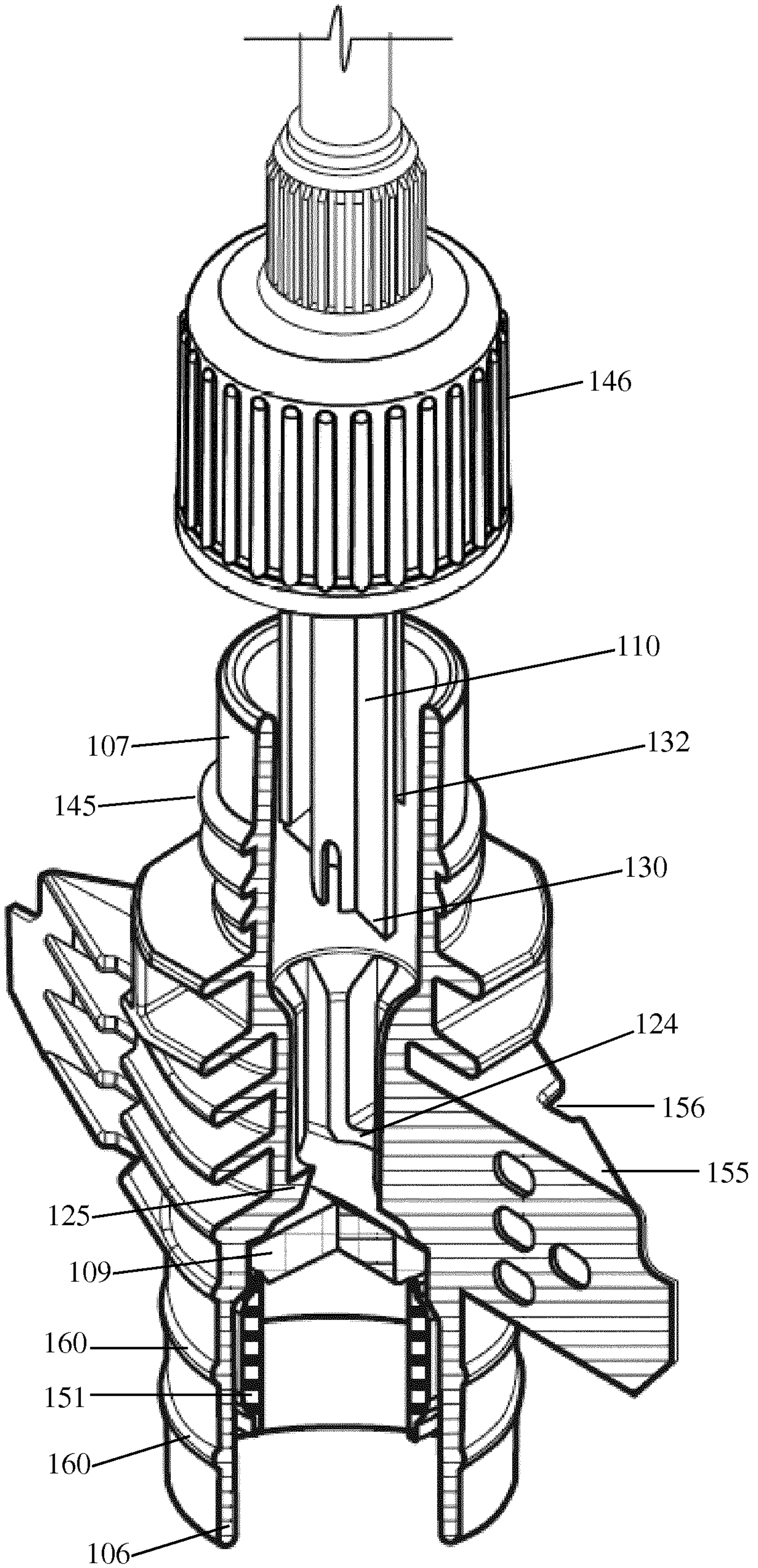
FIG. 37 is a view of the spout of FIG. 36 with a connector shaft correctly aligned with the valve.
Figure 38:
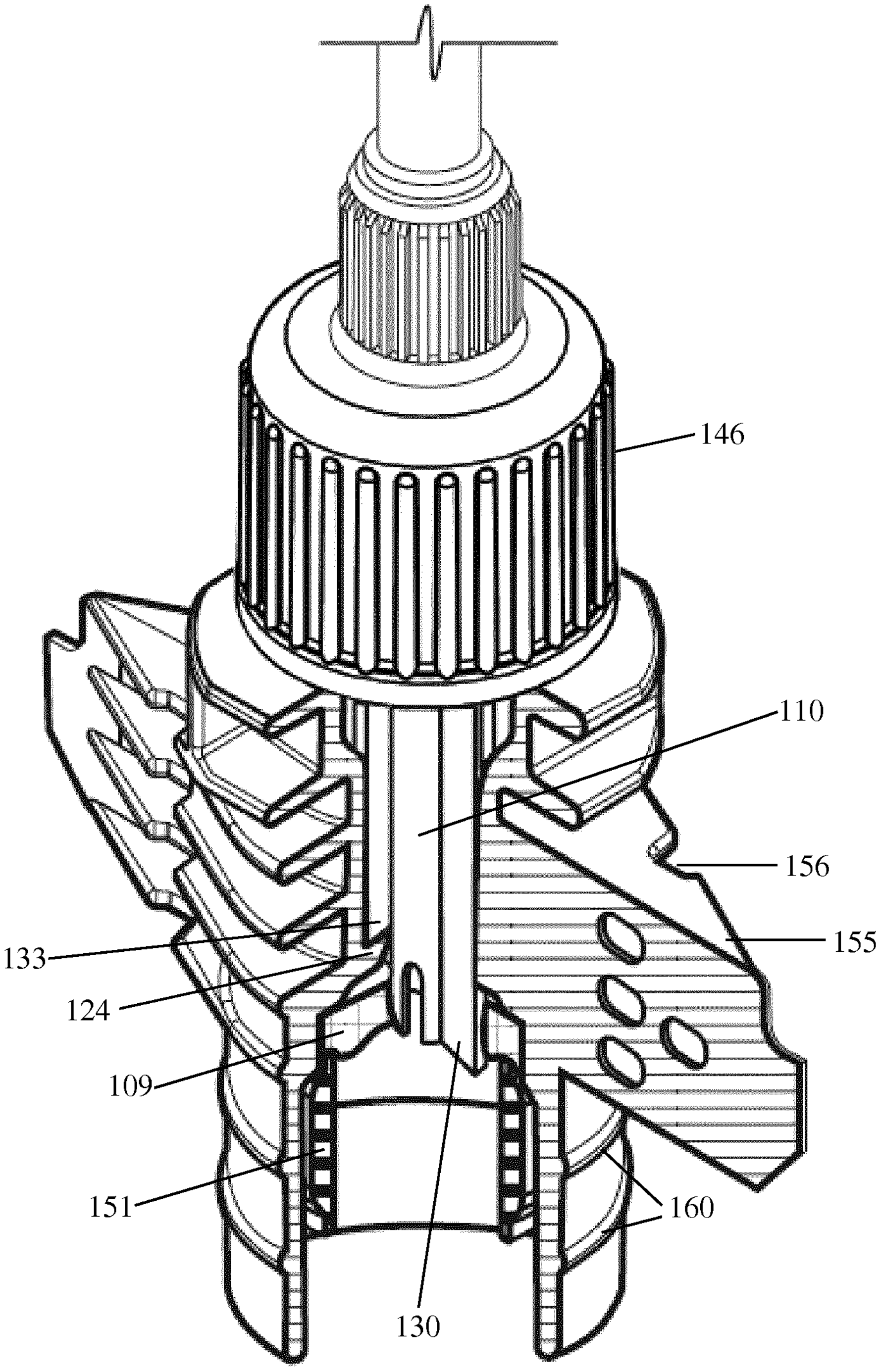
FIGS. 38 and 39 are partially cut-away views of the spout with a connector shaft correctly aligned.
Figure 39:
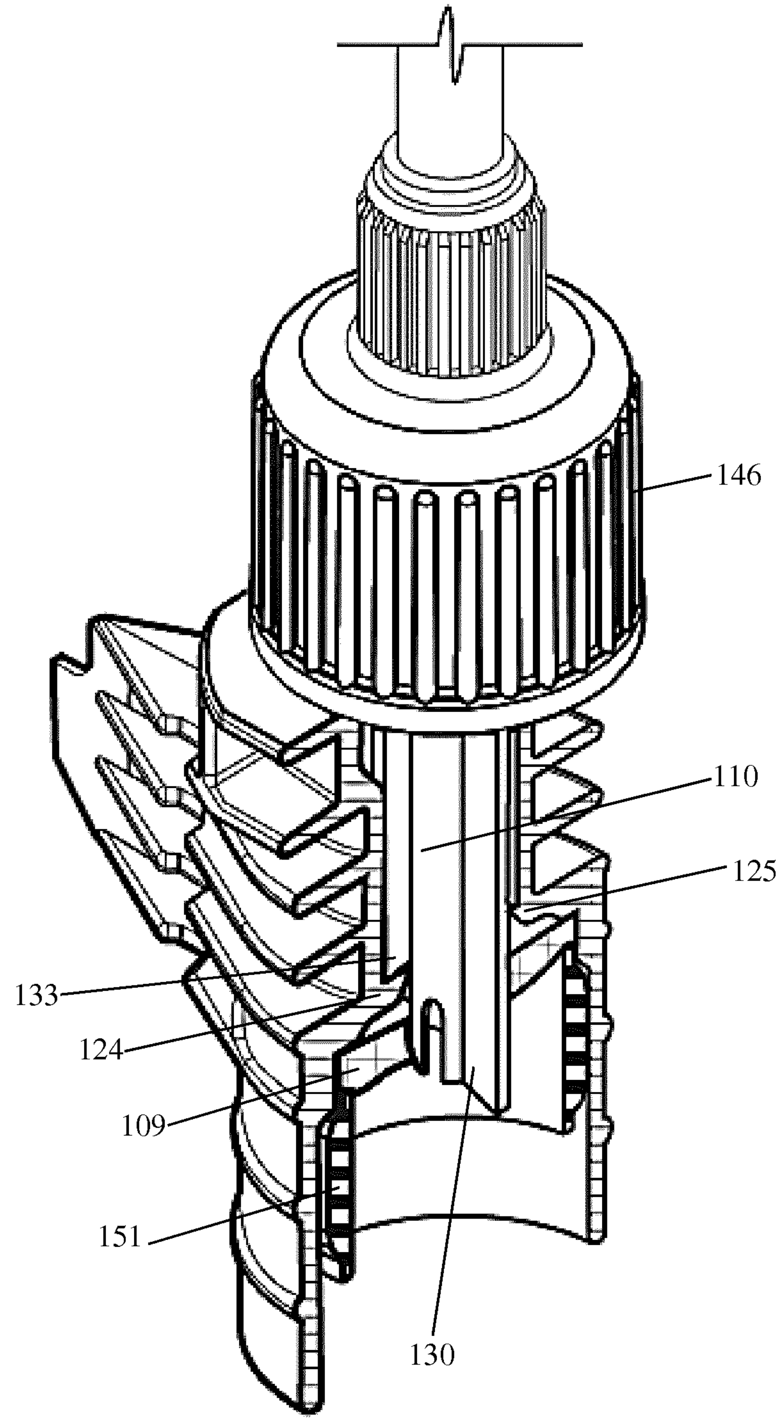

FIG. 35 shows an isometric view of the assembled spout 105 and connector shaft 110 being aligned incorrectly.

Figure 42:
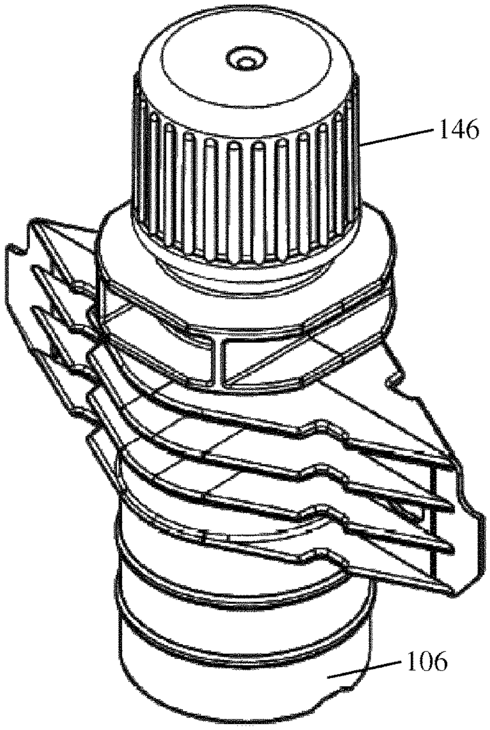
FIG. 42 is an isometric view of the spout.

FIG. 42 shows an isometric view of the assembled spout 105.

Figure 43:
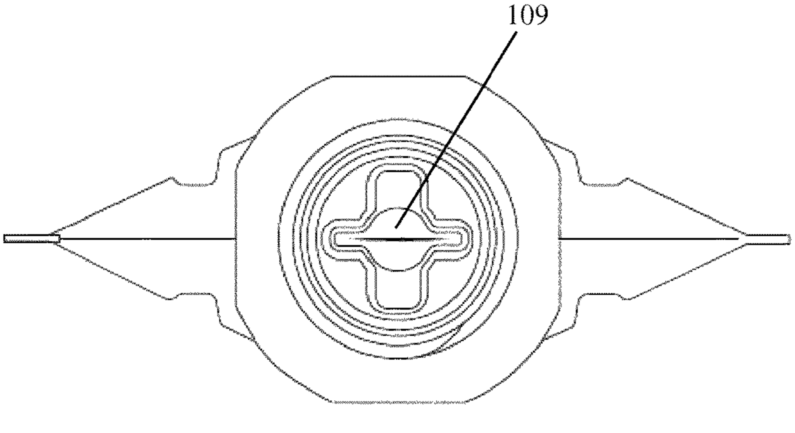
FIG. 43 is a top plan view of the spout of FIG. 42.
Figure 44:
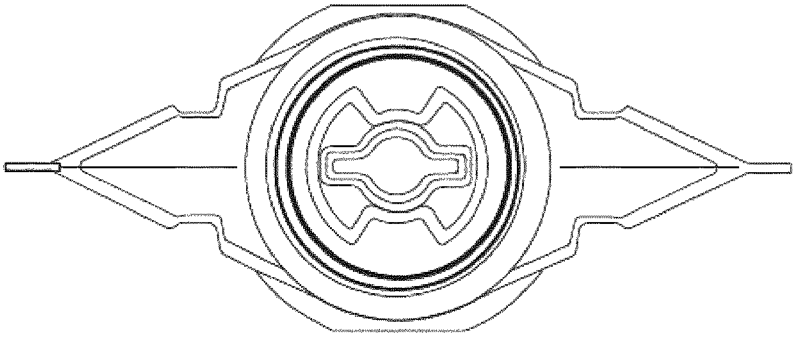
FIG. 44 is a bottom plan view of the spout of FIG. 42.

FIGS. 43 and 44 are plan views from above and below of the assembled spout 105.

Figure 45:
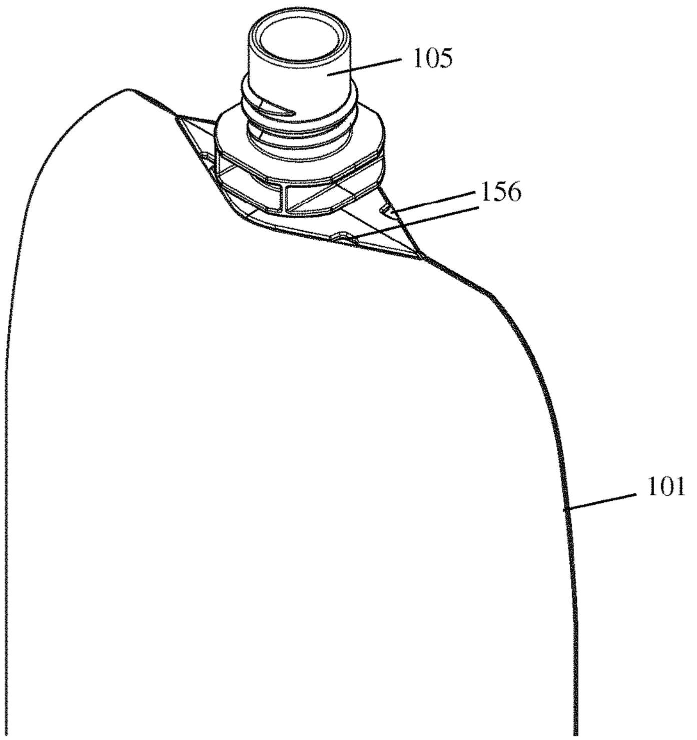
FIG. 45 is a view of the spout mounted to a pouch.

FIG. 45 illustrates the spout 105 sealed to a pouch laminate. The spout has side wings 155 to which the pouch laminate is welded. Air vents 156 are provided to evacuate the space between the expansile pouch and the foil during filling.

Figure 46:
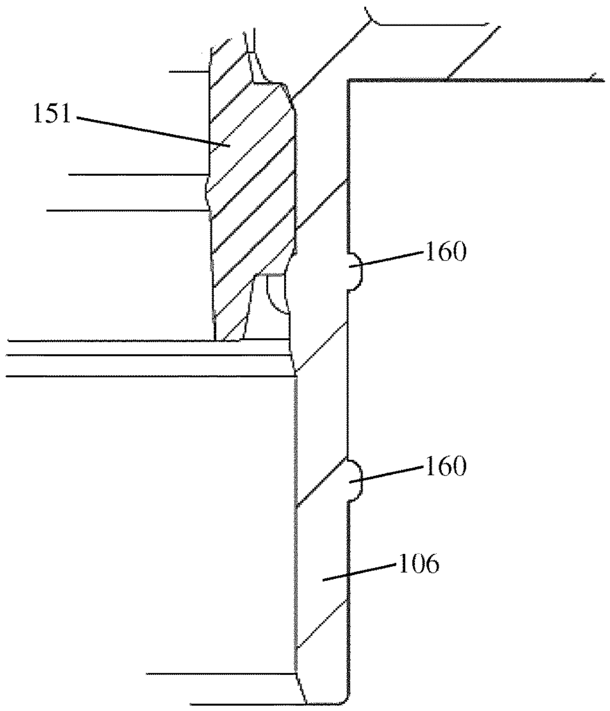
FIG. 46 is an enlarged cross sectional view of portion of the spout.

FIG. 46 is a cut section detail of the retaining ring 151 interacting with the snapfit of the spout 105. The guides 160 for placement of a securing mechanism such as cable ties 161 to retain the pouch are also shown.

The interlock arrangement ensures that the Crossfit spike can only penetrate the valve when the spike and the valve are correctly aligned. This is important as it ensures that a seal is maintained when the Crossfit spike is inserted through the single slit valve. Backflow is prevented. The valve seal also wipes feed from the spike as it is withdrawn.

An enteral feeding pouch is described in our WO2018/108337A, the entire contents of which are incorporated herein by reference. A docking station for use with an enteral feeding apparatus is described in our WO2017/140731A, the entire contents of which are incorporated herein by reference.

Figure 47:
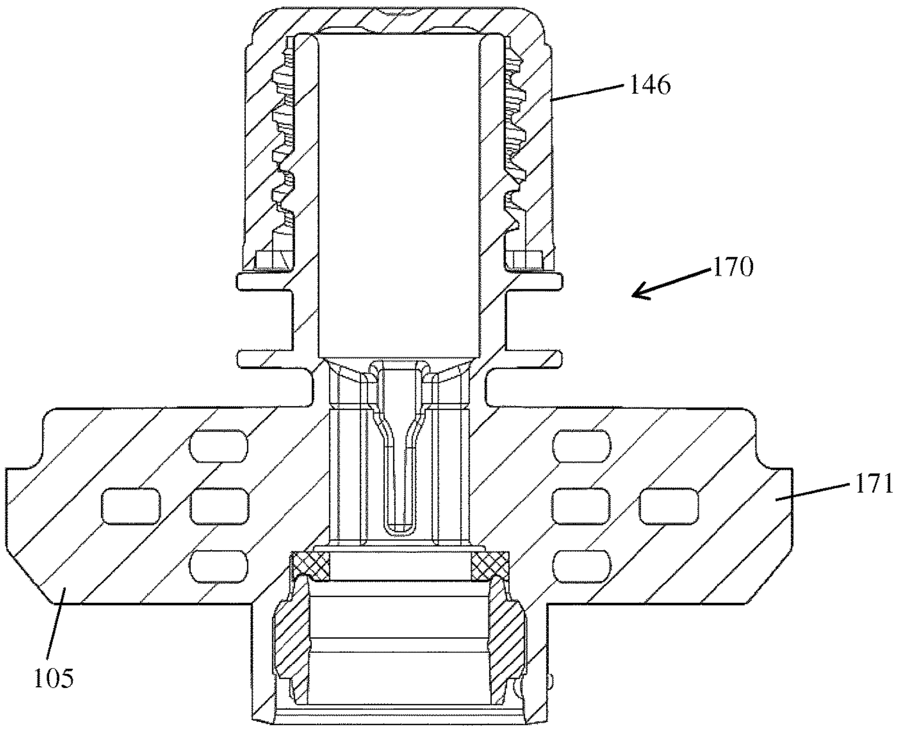
FIG. 47 is a cross sectional view of an alternative spout.

FIG. 47 shows a cut-section of an assembled spout 170 with a shorter extrude below the wings 171. This spout does not have placement for a securing mechanism resulting in a shorter extrude.

Figure 48:
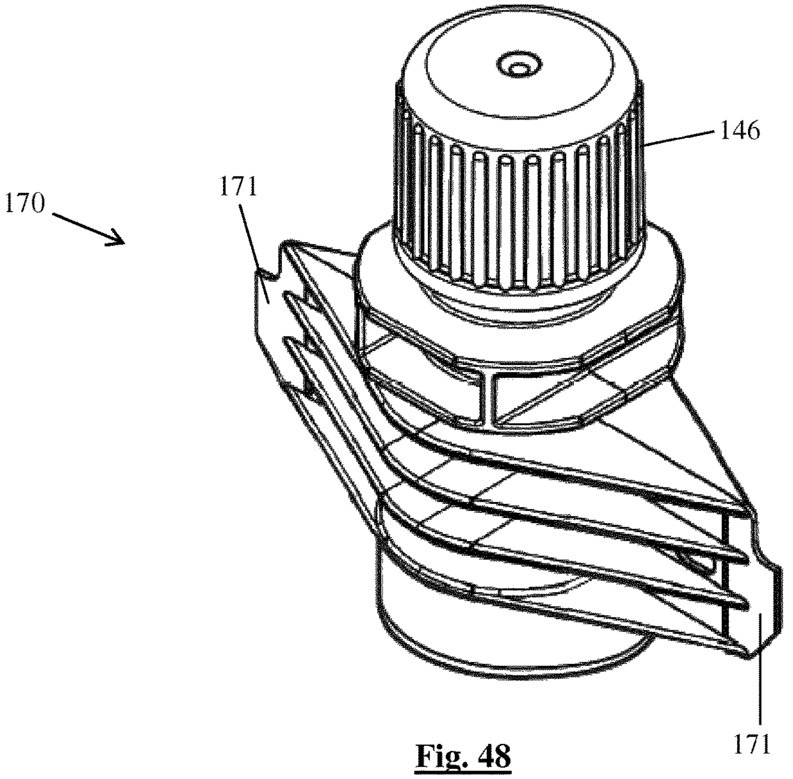
FIG. 48 is an isometric view of the spout of FIG. 47.

FIG. 48 shows the same spout as pictured in FIG. 7 in an isometric view. An air vent is not used in this particular spout.

Figure 49:
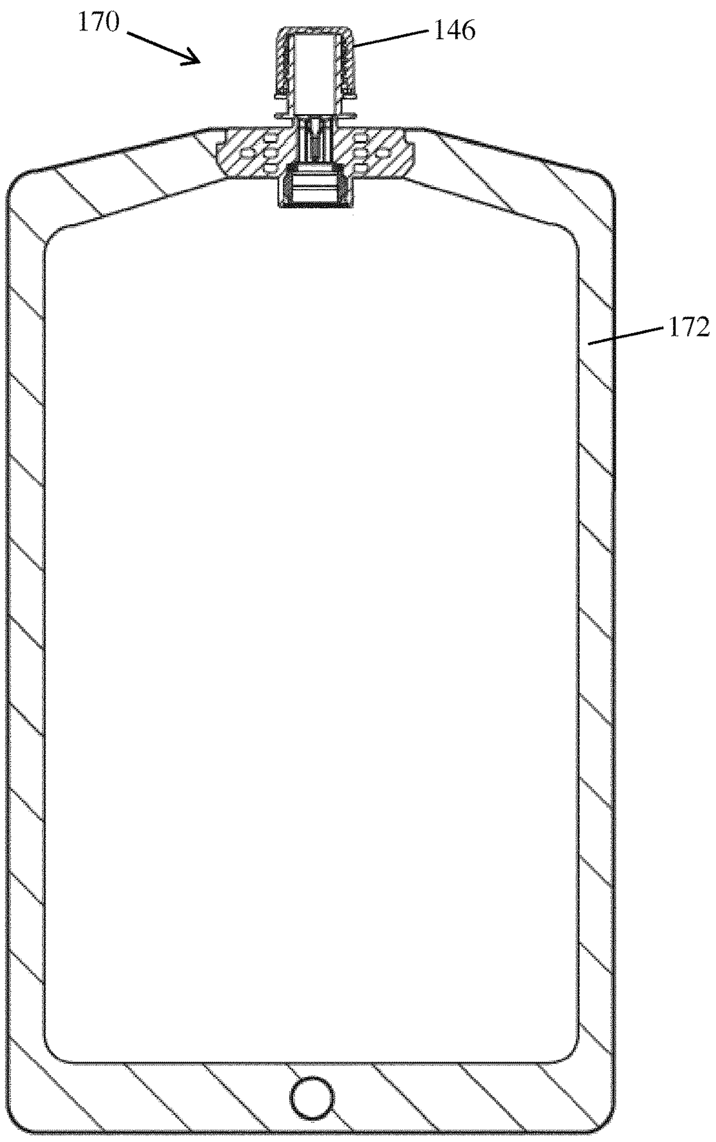
FIG. 49 is a cross sectional view of the spout of FIGS. 47 and 48 mounted to a pouch.

FIG. 49 shows a cut-section of a spout sealed to a laminate packaging 1. This demonstrates that the spout 170 can be used with conventional packaging 172.

Figure 50:
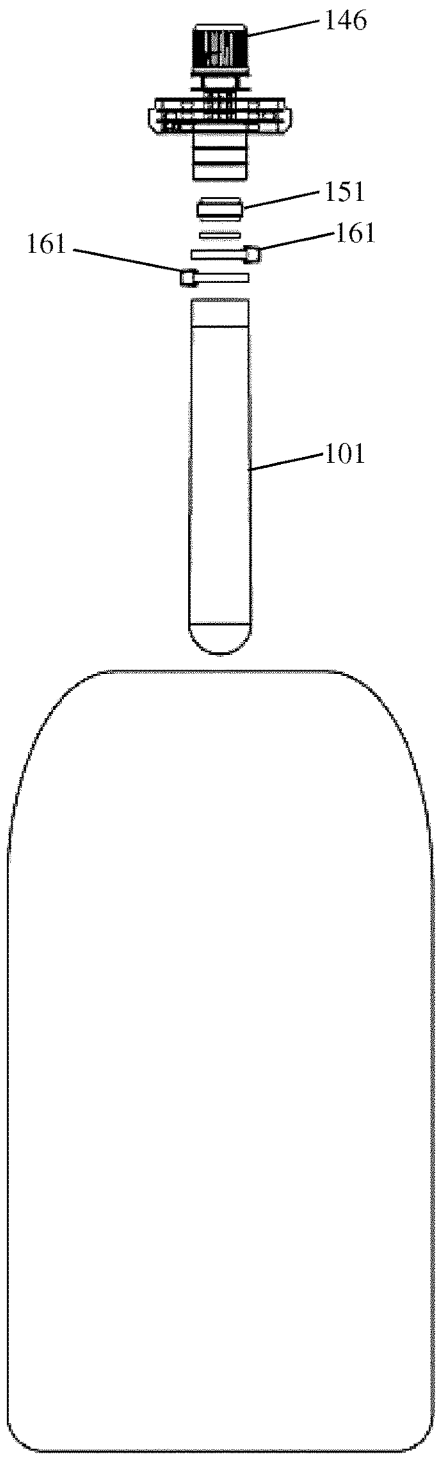
FIG. 50 is an exploded view of a spout and pouch.

FIG. 50 shows an exploded view of the assembled spout, retaining ring 151, silicone valve 109, cable ties 161 (×2), elastomer and foil pouch 101.

Figure 51:
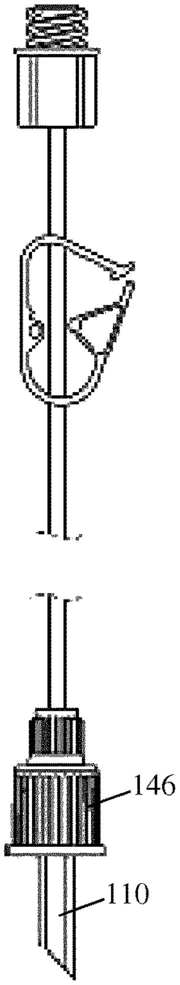
FIG. 51 is a view of a giving set.

FIG. 51 shows a front view of a giving set (delivery tube) with ISO18250-3 connector shaft 110.

Figure 52:
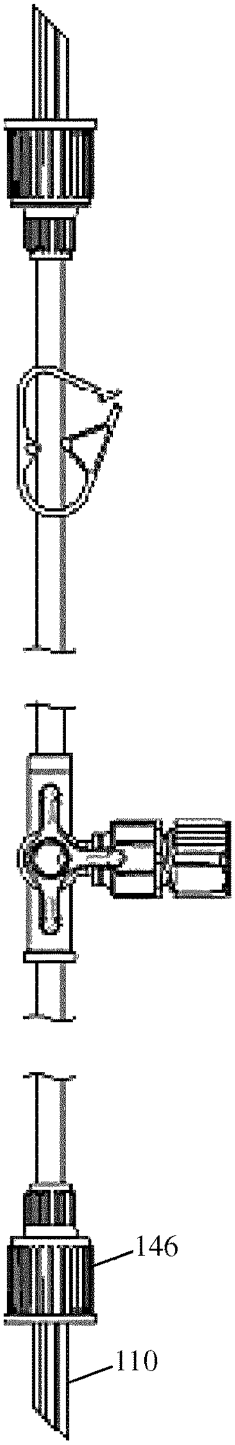
FIG. 52 is a view of a filling set for filling the pouch.

FIG. 52 shows the filling set with ISO18250-3 connector shaft 110 on either end.

Figure 53:
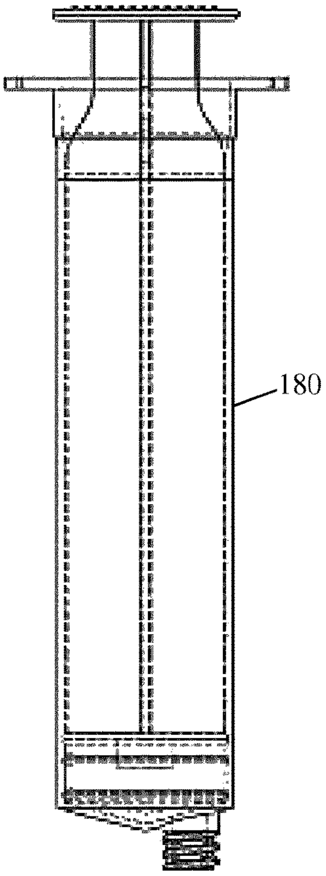
FIG. 53 is a view of a typical syringe.

FIG. 53 shows an ISO80369-3 syringe 180.

Figure 54:
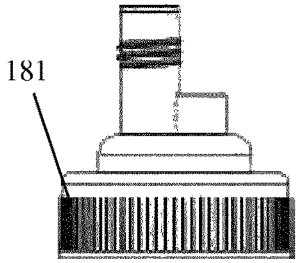
FIG. 54 is a view of an adaptor for correcting feed bottles.

FIG. 54 shows an image of a universal adapter 181 used to connect some feed bottle types to an ISO18250-3 system.

The invention is not limited to the embodiment hereinbefore described, which may be varied in construction and detail.

The invention claimed is:

1. A portable enteral feeding apparatus comprising:
- a pouch which defines a reservoir for enteral fluid and having an outlet for delivery of enteral fluid from the pouch;
- an outlet spout comprising:
  - a pouch spigot connected to the pouch outlet, and
  - a connector spigot which is adapted for mounting of a connector shaft;
  - a valve mounted to the outlet spout, and
  - a valve receiver for the valve;
- a connector comprising:
  - proximal mounting features for connection to a PEG feeding tube,
  - a cap having screw threads,
  - a cross connector distal shaft comprising connector formations which engage with the connector spigot; and
- an interlock to prevent fixing of the cross connector distal shaft to the connector spigot if the distal shaft is not extended through the valve, said interlock comprising:
  - connector spigot screw threads which engage with said screw threads of the cap, in which the connector spigot screw threads are adapted for engagement with the connector cap screw threads only when said distal shaft extends through the valve, and
  - a plurality of grooves in said connector spigot and an end stop in at least one of the grooves to prevent passage of the cross connector distal shaft when the cross connector distal shaft is incorrectly positioned in said connector spigot, wherein the connector spigot comprises four grooves of at least two different lengths, each groove of the four grooves being 90° circumferentially spaced-apart from an adjacent groove, two of the four grooves, being a shorter of the four grooves of at least two different lengths, which are spaced-apart by 180° having end stops, and
  - the cross connector distal shaft having four ribs of at least two different lengths, two of the four ribs being a shorter rib, with leading edges of the two shorter ribs engaging with the end stops of the two shorter grooves only when leading edges of two longer ribs extend through a slit of the valve of the outlet spout so as to allow flow of the enteral fluid through a channel of the cross connector distal shaft;

and wherein:
- the pouch comprises an expansile element having an expanded filled configuration and a collapsed configuration,
- the pouch spigot is adapted for mounting the pouch outlet to the pouch spigot, and
- the pouch spigot comprises a mounting feature to which the expansile element is mounted.

2. The enteral feeding apparatus as claimed in claim 1, wherein the valve receiver comprises a ledge for engagement with the valve.

3. The enteral feeding apparatus as claimed in claim 1, wherein the valve receiver comprises a ledge for engagement with the valve; and further comprising a retainer element for retaining the valve in position in the outlet spout.

4. The enteral feeding apparatus as claimed in claim 1, wherein the valve is a slit valve.

5. The enteral feeding apparatus as claimed in claim 1, wherein the valve comprises an elastomeric material.

6. The enteral feeding apparatus as claimed in claim 1, wherein the pouch spigot comprises side wings for mounting the pouch to the pouch spigot.

7. The enteral feeding apparatus as claimed in claim 1, wherein the pouch spigot comprises side wings for mounting the pouch to the pouch spigot; and wherein at least one of the wings comprises an air vent for venting of air during filling of the pouch.

8. The enteral feeding apparatus as claimed in claim 1, comprising a housing, and wherein the pouch spigot is adapted for mounting an outlet of the expansile element to the pouch spigot; and further comprising a locking element for mounting the expansile element to the mounting feature of the housing pouch spigot.

9. The enteral feeding apparatus as claimed in claim 1, wherein the pouch outlet also provides an inlet for filling the enteral fluid into the pouch.

10. The enteral feeding apparatus as claimed in claim 1, wherein the expansile element is configured such that expansion of the expansile element provides a sole force under which enteral fluid is delivered from the pouch.

11. The enteral feeding apparatus as claimed in claim 1, further comprising a substantially gas impermeable barrier surrounding the pouch and having an inner surface; and wherein the pouch is configured so that, when the pouch is filled with enteral fluid, the pouch substantially conforms to a shape of the inner surface of the barrier.

12. The enteral feeding apparatus as claimed in claim 1, further comprising a substantially gas impermeable barrier surrounding the pouch and having an inner surface; and wherein the pouch is configured so that, when the pouch is filled with enteral fluid, the pouch substantially conforms to a shape of the inner surface of the barrier; and as fluid is delivered from the pouch, a space is formed between the pouch and the barrier.

13. The enteral feeding apparatus as claimed in claim 12, wherein the barrier comprises a membrane; and wherein the membrane comprises a laminate including a metallic layer.

14. The enteral feeding apparatus as claimed in claim 12, wherein the barrier comprises a membrane; and wherein the membrane comprises a laminate including a metallic layer; and wherein the membrane comprises a PET layer.

15. An enteral feeding apparatus as claimed in claim 1, wherein the pouch is connected to the outlet spout by a plastics fitment ring or a cable tie.

* * * * *